United States Patent
Bulgakov et al.

(10) Patent No.: US 12,146,037 B2
(45) Date of Patent: Nov. 19, 2024

(54) COMPOSITION OF PHTHALONITRILE RESIN MATRIX FOR POLYMER COMPOSITE MATERIALS, METHOD FOR FABRICATION THEREOF, METHOD FOR MANUFACTURING OF POLYMER COMPOSITE MATERIAL, AND MATERIAL OBTAINED BY THIS METHOD

(71) Applicant: Joint Stock Company "Institute of New Carbon Materials and Technologies", Moscow (RU)

(72) Inventors: Boris Anatolievich Bulgakov, Moscow (RU); Aleksandr Vladimirovich Babkin, Moscow (RU); Alexey Valerievich Kepman, Moscow (RU); Viktor Vasilievich Avdeev, Moscow (RU)

(73) Assignee: Joint Stock Company "Institute of New Carbon Materials and Technologies", Moscow (RU)

( * ) Notice: Subject to any disclaimer, the term of this patent is extended or adjusted under 35 U.S.C. 154(b) by 716 days.

(21) Appl. No.: 17/292,348

(22) PCT Filed: Nov. 7, 2019

(86) PCT No.: PCT/RU2019/050210
§ 371 (c)(1),
(2) Date: May 7, 2021

(87) PCT Pub. No.: WO2020/096498
PCT Pub. Date: May 14, 2020

(65) Prior Publication Data
US 2022/0017712 A1 Jan. 20, 2022

(30) Foreign Application Priority Data
Nov. 8, 2018 (RU) ................................. 2018139428

(51) Int. Cl.
| | | |
|---|---|---|
| *C08J 5/24* | (2006.01) |
| *C08G 73/06* | (2006.01) |
| *C08J 5/04* | (2006.01) |
| *C08J 5/06* | (2006.01) |
| *C08K 5/17* | (2006.01) |
| *C08K 5/42* | (2006.01) |
| *C08K 5/523* | (2006.01) |
| *C08L 79/08* | (2006.01) |

(52) U.S. Cl.
CPC .......... *C08J 5/243* (2021.05); *C08G 73/0644* (2013.01); *C08J 5/042* (2013.01); *C08J 5/06* (2013.01); *C08K 5/17* (2013.01); *C08K 5/42* (2013.01); *C08K 5/523* (2013.01); *C08L 79/08* (2013.01); *C08J 2379/08* (2013.01)

(58) Field of Classification Search
None
See application file for complete search history.

(56) References Cited

U.S. PATENT DOCUMENTS

| | | |
|---|---|---|
| 4,056,560 A | 1/1977 | Griffith et al. |
| 4,259,471 A | 3/1981 | Keller et al. |
| 4,587,325 A | 5/1986 | Keller |
| 5,965,268 A | 10/1999 | Sastri et al. |
| 8,921,510 B1 | 12/2014 | Keller et al. |
| 8,981,036 B2 | 3/2015 | Keller et al. |
| 2016/0168327 A1 | 6/2016 | Keller et al. |
| 2016/0311976 A1 | 10/2016 | Laskoski et al. |
| 2020/0131336 A1* | 4/2020 | Anderson ............ C07C 255/54 |

FOREIGN PATENT DOCUMENTS

| | | |
|---|---|---|
| CN | 103834008 | 9/2016 |
| RU | 2201423 | 3/2003 |
| RU | 106897 | 7/2011 |
| RU | 2638307 | 12/2017 |
| WO | WO 2016/064298 | 4/2016 |
| WO | WO 2016/100259 | 6/2016 |

(Continued)

OTHER PUBLICATIONS

Aerosil, "Aerosil R 202," Apr. 2021, retrieved from URL <https://products-re.evonik.com/www2/uploads/productfinder/AEROSIL-R-202-EN.pdf>, 2 pages.

Augustine et al., "End-functionalized thermoplastic-toughened phthalonitrile composites: influence on cure reaction and mechanical and thermal properties," Polym. Int., Jan. 2015, 64(1):146-153.

Augustine et al., "Phenol-containing phthalonitrile polymers—synthesis, cure characteristics and laminate properties," Polym. Int., Jul. 2013, 62(7):1068-1076.

Babkin et al., "Low-melting siloxane-bridged phthalonitriles for heat-resistant matrices," European Polymer Journal, May 2015, 66:452-457.

(Continued)

*Primary Examiner* — Robert T Butcher
(74) *Attorney, Agent, or Firm* — Fish & Richardson P.C.

(57) ABSTRACT

This disclosure related to a resin matrix composition includes: (1) polymerizable mixture containing one or more bis-phthalonitrile monomers in the amount of 20-94 wt % of the polymerizable mixture weight; one or more reactive plasticizer-fire retardants in the amount from 1 to 50% of the total polymerizable mixture weight; curing agent in the amount from 1 to 20% of the total polymerizable mixture. The total content of the polymerizable mixture and the curing agent is from 60 to 100 wt % of the total resin matrix weight. The invention allows to increase the thermal stability of the resin matrix and obtain composite material which after curing possesses increased thermal stability at temperatures up to 450° C., have melting points or glass transition temperatures of no more than 50° C., provide melt viscosities below 800 mPa·s at temperatures from 100 to 180° C. and below 300 mPa·s at temperatures from 120 to 180° C.

46 Claims, No Drawings

(56) References Cited

FOREIGN PATENT DOCUMENTS

| WO | WO 2016/190621 | 12/2016 |
|----|----------------|---------|
| WO | WO 2017/173040 | 10/2017 |

OTHER PUBLICATIONS

Bulgakov et al., "Flame-retardant carbon fiber reinforced phthalonitrile composite for high- temperature applications obtained by resin transfer molding," Mendeleev Communications, May 2017, 27(3):257-259.

Bulgakov et al., "Low-melting phthalonitrile thermosetting monomers with siloxane- and phosphate bridges, " Eur. Polym. J., Nov. 2016, 84:205-217.

Bulgakov et al., "Mechanical and physicochemical properties of matrices for fiber reinforced plastics based on lowmelting phthalonitrile monomers," Russian Chemical Bulletin, International Edition, Jan. 2016, 65(1):287-290.

Bulgakov et al., "Phthalonitrile-carbon fiber composites produced by vacuum infusion process," Journal of Composite Materials, Mar. 2017, 51(30):4157-4164.

Chen et al., "Preparation and Properties of Bisphenol A-Based Bis-phthalonitrile Composite Laminates," J. Appl. Polym. Sci., Sep. 2013, 129(5):2621-2628.

compositesworld.com [online], "Resin-infused MS-21 wings and wingbox," Jan. 1, 2014, retrieved on Jul. 30, 2021, retrieved from URL <https://www.compositesworld.com/articles/resin-infused-ms-21-wings-and-wingbox>, 5 pages.

Dominguez et al., "Low-melting Phthalonitrile Oligomers: Preparation, Polymerization and Polymer Properties," High Perform. Polym., Jun. 2006, 18(3):283-304.

Dominguez et al., "The Effect of Curing Additive on the Mechanical Properties of Phthalonitrile-Carbon Fiber Composites," Polym. Compos., Oct. 2004, 25(5):554-561.

International Preliminary Report on Patentability in International Appln. No. PCT/RU2019/050210, mailed May 20, 2021, 8 pages.

International Search Report and Written Opinion in International Appln. No. PCT/RU2019/050210, dated Feb. 13, 2020, 10 pages.

Laskoski et al., "Improved Synthesis of Oligomeric Sulfone-Based Phthalonitriles," Macromol. Chem. Phys., Sep. 2015, 216(17):1808-1815.

Laskoski et al., "Oligomeric Aliphatic-Aromatic Ether Containing Phthalonitrile Resins," J. Polym. Sci., Part A: Polym. Chem., Sep. 2015, 53(18):2186-2191.

Laskoski et al., "Synthesis of Bisphenol A-Free Oligomeric Phthalonitrile Resins with Sulfone and Sulfone-Ketone Containing Backbones," J. Polym. Sci., Part A: Polym. Chem., Jun. 2016, 54(11):1639-1646.

Liu et al., "Synthesis and properties of phthalonitrile-terminated oligomeric poly(ether imide)s containing a phthalazinone moiety," Polymer Degradation and Stability, Mar. 2012, 97(3):460-468.

Luo et al., "Effect of Ortho-Diallyl Bisphenol A on the Processability of Phthalonitrile-Based Resin and Their Fiber-Reinforced Laminates," Polym. Eng. Sci., Feb. 2016, 56(2):150-157.

Norit, "Norit SA 4 PAH," Apr. 27, 2009, retrieved from URL <http://www.vulcascot.co.at/media/content/downloads/noritsa4pah.pdf>, 2 pages.

Rudd, "Resin Transfer Molding and Structural Reaction Injection Molding," ASM Handbook vol. 21: Composites, 2001, 61 pages.

Sastri et al., "Phthalonitrile-Carbon Fiber Composites," Polym. Compos., Dec. 1996, 17(6):816-822.

Sastri et al., "Phthalonitrile-Glass Fabric Composites," Polym. Compos., Feb. 1997, 18(1):48-54.

Sheng et al., "Synthesis of high performance bisphthalonitrile resins cured with self-catalyzed 4-aminophenoxy phthalonitrile, " Thermochimica Acta, Feb. 2014, 577:17-24.

teijincarbon.com [online], "Teijin Carbon—Your partner for advanced carbon fiber solutions," retrieved on Jul. 30, 2021, retrieved from URL <https://www.teijincarbon.com/ru/produkci%D1%8F/uglerodn%D1%8Be-volokna-tenax%C2%AE/zzgut%D1%8B-tenax%C2%AE/>, 2 pages.

Wang et al., "Preparation of self-promoted hydroxy-containing phthalonitrile resins by an in situ reaction, " RSC Adv., Nov. 2015, 5(127):105038-105046.

Zhang et al., "Self-Catalyzed Silicon-Containing Phthalonitrile Resins with Low Melting Point, Excellent Solubility and Thermal Stability," J. Appl. Polym. Sci., Oct. 2014, 131(20): 8 pages.

Zong et al., "Enhanced thermal properties of phthalonitrile networks by cooperating phenyl-s-triazine moieties in backbones, " Polymer, Oct. 2015, 77:177-188.

* cited by examiner

COMPOSITION OF PHTHALONITRILE RESIN MATRIX FOR POLYMER COMPOSITE MATERIALS, METHOD FOR FABRICATION THEREOF, METHOD FOR MANUFACTURING OF POLYMER COMPOSITE MATERIAL, AND MATERIAL OBTAINED BY THIS METHOD

CROSS-REFERENCE TO RELATED APPLICATIONS

This application is a National Stage application under 35 U.S.C. § 371 of International Application No. PCT/RU2019/050210, having an International Filing Date of Nov. 7, 2019, which claims the benefit of Russian Application No. 2018139428, filed Nov. 8, 2018. All of these applications are herein incorporated by reference in their entirety.

The invention relates to the field of polymer chemistry and technology of polymer composite materials (PCM) and fiber reinforced plastics, in particular to a composition of a phthalonitrile resin for polymer composite materials, a method for its production, a method for curing of the said resin matrix, method for production of a polymer composite material, and the material obtained via this method.

BACKGROUND OF THE INVENTION

The prior art for production of polymer composite materials (PCM) involves use of various matrices. That being said, the resin matrices for PCM based on phthalonitrile monomers are known as the most thermally stable polymer matrices.

First exploration of these resins took place in the end of 1970s—the beginning of 1980s. For instance, document U.S. Pat. No. 4,056,560 (US NAVY), 01.11.1977 known from prior art discloses the composition and method for production of bis-phthalonitrile monomers capable of polymerization with formation of thermally stable polymers (up to 350° C.). The polymerization can take place both thermally or in the presence of transition metal salt catalysts. Another document known from prior art—U.S. Pat. No. 4,259,471 (US NAVY), 31.03.1981 discloses a method for producing bis-phthalonitriles bound by an ether bridge, as well as their compositions containing salts of transition metals that allow to obtain cross-linked thermally stable polymers when heated.

The structure of a phthalonitrile monomer suitable for being used as a base for polymer matrices of PCM is described in generalized form by formula I shown below.

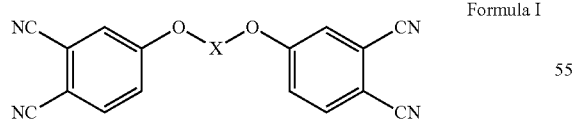

Formula I

The monomer is a linear molecule that contains phthalonitrile (1,2-dicyano-4-phenyl) groups on both ends which are joined through ether bonds with fragment X—a bivalent aromatic, aliphatic, or heteroatomic fragment. The polymerization (curing) of matrices containing such monomers occurs via chemical transformation of the terminal phthalonitrile moieties into isoindoline, triazine, and phthalocyanine structures, resulting in formation of a cross-linked three-dimensional network:

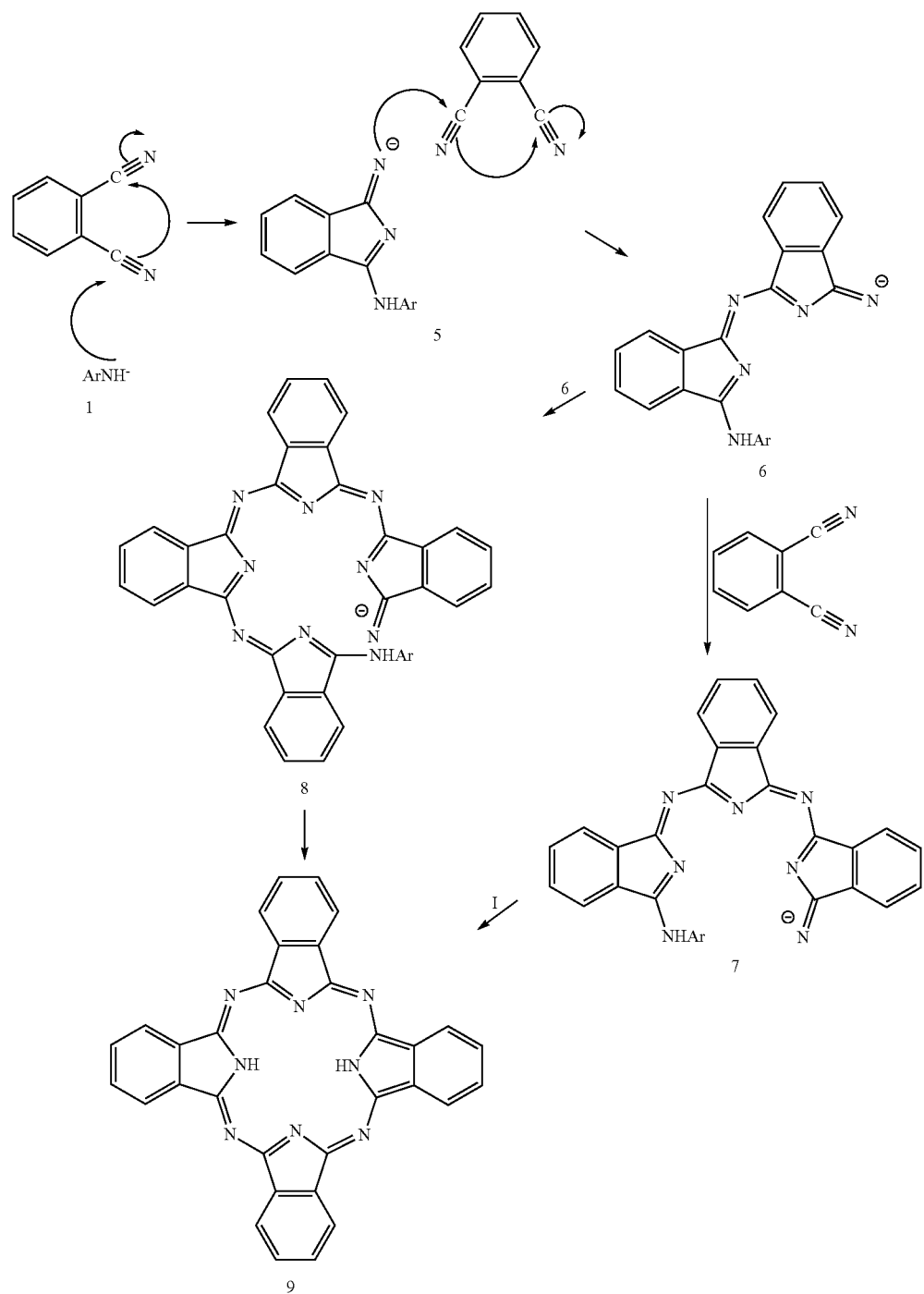

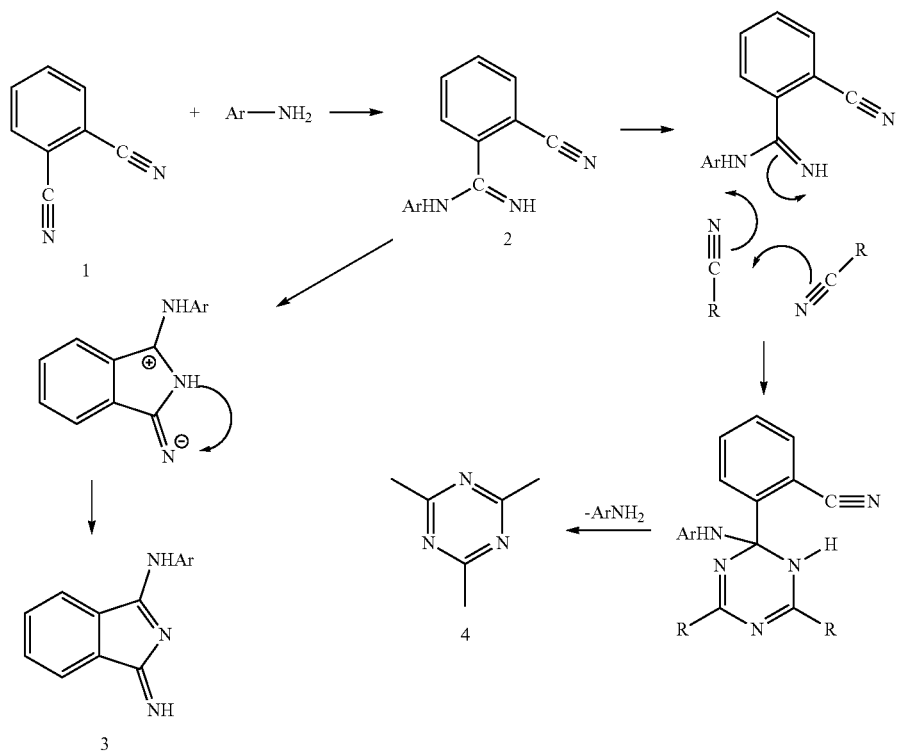

Curing is initiated by a nucleophilic attack of the cyano groups. Typically, aromatic amines, aromatic diamines, phenols, bisphenols, and other nucleophilic agents are used as curing agents.

For a long time phthalonitriles were not used as matrices for PCM since such monomers had high melting points (>170° C.), which meant that they had narrow processing windows as their rapid polymerization occurred at temperatures around 200° C. For instance, document U.S. Pat. No. 4,587,325 (US NAVY), 06.05.1986 states that the polymerization of phthalonitriles in the presence of amines begins at 200° C.

Presently, a limited number of publications describes production and properties of structural PCM based on phthalonitrile matrices (Sastri S. B., Armistead J. P., Keller T. M. Phthalonitrile-carbon fiber composites//Polym. Compos. Wiley Subscription Services, Inc., A Wiley Company, 1996. Vol. 17, No 6. P. 816-822; Sastri S. B. et al. Phthalonitrile-glass fabric composites//Polym. Compos. Wiley Subscription Services, Inc., A Wiley Company, 1997. Vol. 18, No 1. P. 48-54; Dominguez D. D., Jones H. N., Keller T. M. The effect of curing additive on the mechanical properties of phthalonitrile-carbon fiber composites//Polym. Compos. Society of Plastics Engineers, 2004. Vol. 25, No 5. P. 554-561; Augustine D., Mathew D., Reghunadhan Nair C. End-functionalized thermoplastic-toughened phthalonitrile composites: influence on cure reaction and mechanical and thermal properties//Polym. Int. John Wiley & Sons, Ltd, 2015. Vol. 64, No. 1. P. 146-153; Zong L. et al. Enhanced thermal properties of phthalonitrile networks by cooperating phenyl-s-triazine moieties in backbones//Polymer (Guildf). 2015. Vol. 77. P. 177-188; Luo Y. et al. Effect of ortho-diallyl bisphenol A on the processability of phthalonitrile-based resin and their fiber-reinforced laminates//Polym. Eng. Sci. 2016. Vol. 56, No 2. P. 150-157; Chen Z. et al. Preparation and properties of bisphenol A-based bis-phthalonitrile composite laminates//J. Appl. Polym. Sci. Wiley Subscription Services, Inc., A Wiley Company, 2013. Vol. 129, No 5. P. 2621-2628; Augustine D., Mathew D., Nair C. P. R. Phenol-containing phthalonitrile polymers—synthesis, cure characteristics and laminate properties//Polym. Int. John Wiley & Sons, Ltd, 2012. Vol. 62, No 7. P. n/a-n/a.; Laskoski M. et al. Synthesis of bisphenol A-free oligomeric phthalonitrile resins with sulfone and sulfone-ketone containing backbones//J. Polym. Sci. Part A Polym. Chem. 2016. Vol. 54, No 11. P. 1639-1646.). In most of these publications the composite is formed from a prepreg obtained via solution impregnation process.

One of the first publications on development of PCM based on phthalonitrile resins is document by Sastri S. B., Armistead J. P., Keller T. M. Phthalonitrile-carbon fiber composites//Polym. Compos. Wiley Subscription Services, Inc., A Wiley Company, 1996. Vol. 17, No 6. P. 816-822, which describes PCM based on 4,4'-bis(3,4-dicyaphenoxy) biphenyl (PN) with formula Formula II

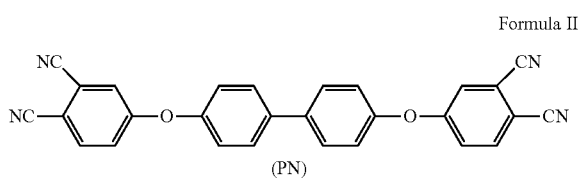

(PN)

and "IM-7 12K" unidirectional carbon tape.

To obtain the resin matrix, a curing agent 1,3-bis(3-aminophenoxy)-benzene (APB) with formula III was added to the monomer melt at 234° C. to the concentration of 2.1%

(w/w). After intensive mixing at 250° C. for 15 minutes, the resin was cooled to room temperature and used to manufacture PCM.

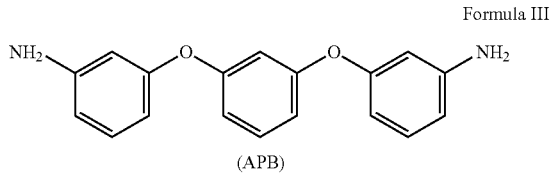 [SMILES: Nc1cccc(Oc2cccc(Oc3cccc(N)c3)c2)c1]

Formula III (APB)

The obtained pre-polymer had $T_m \sim 80°$ C., was soluble in several organic solvents, and had pot-life in standard conditions. Next, a prepreg was obtained by solution impregnation process, and a PCM was fabricated. This step consisted in laying up prepreg in 10 plies between two metal plates inside a vacuum bag, after which the assembled bag was put under vacuum and heated up to 250° C. in an autoclave and held at that temperature for 30 minutes, then 1.4 MPa of pressure were applied followed by additional 30 min of high temperature. The final stage of the curing cycle was heating up to 325° C. at the rate of 4°/min, holding at that temperature for 3 hours, followed by cooling at the rate of 4°/min.

When studying the mechanical properties of a PCM based on phthalonitrile resin matrices and comparing them to PMR-15, a similarity in tensile strength parameters with a small advantage of the polyimide PCM is observed, however the phthalonitrile-based composite exhibits a significantly higher flexural strength (table 4). Moreover, the authors point out the high thermal stability: the ignition time is 75 s, thus PCM based on phthalonitriles comply with the US Navy standards.

Later, a prepreg based on the same phthalonitrile resin matrix with glass fabric reinforcing material was obtained and molded into a PCM following an analogous procedure (Sastri S. B. et al. Phthalonitrile-glass fabric composites// Polym. Compos. Wiley Subscription Services, Inc., A Wiley Company, 1997. Vol. 18, No 1. P. 48-54.). Furthermore, a PCM was also obtained via vacuum infusion with impregnation temperature of 260° C.

The modern trend in fabrication of PCM parts is to move away from the autoclave molding techniques. One of the most promising out-of-autoclave methods is vacuum infusion as it does not require expensive equipment and auxiliary materials and does not limit the size of the fabricated parts. Using vacuum infusion in fabrication of monolith wingbox panels of the new jet aircraft MS-21 instead of autoclave techniques allowed to decrease the part cost by the factor of 4 from $2 million to $0.5 million (https://www-.compositesworld.com/articles/resin-infused-ms-21-wings-and-wingbox). However, vacuum infusion requires use of low-viscosity resins (viscosity η<500 mPa·s).

One of the technical challenges that often comes up during resin matrix production is the selection of the type and amount of the curing agent, since increasing the initiator content speeds up the curing process along with PCM molding, however it also decreases the lifetime of the resin, bringing forth additional technological challenges.

The influence of curing agents on the properties of phthalonitrile resins and PCM was studied in a paper by Dominguez D. D., Jones H. N., Keller T. M. The effect of curing additive on the mechanical properties of phthalonitrile-carbon fiber composites//Polym. Compos. Society of Plastics Engineers, 2004. Vol. 25, No 5. P. 554-561. This was accomplished by adding bis(4-(4-aminophenoxy)phenyl) sulfone (p-BAPS) or 1,3-bis(3-aminophenoxy)-benzene (m-APB) initiator to the melt of 4,4'-bis(3,4-dicyanophenoxy)biphenyl and obtaining prepregs via solution impregnation process.

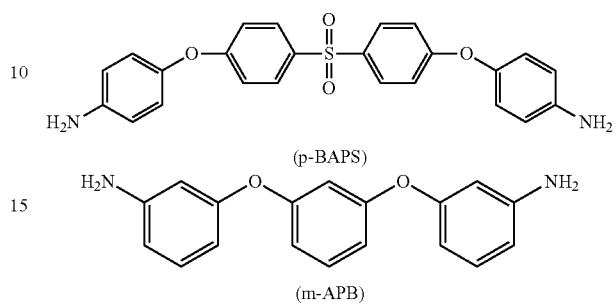

(p-BAPS)

(m-APB)

Sheets of prepreg were laid out in a metal mold, degassed under vacuum, and cured under the pressure of 1.4 MPa according to the following procedure: holding at 280° C. for 1 hour, then at 325° C. for 1 hour, at 350° C. for 1 hour, at 375° C. for 8 hours (heating and cooling rates of 3°/min). As a result of mechanical properties investigation, it was discovered that when p-BAPS was used the complete curing of the PCM occurred during the final heating step of holding at 375° C. for 8 hours. Moreover, it was shown that using m-APB did not result in any significant changes of mechanical properties.

In a paper by Augustine D., Mathew D., Nair C. P. R. Phenol-containing phthalonitrile polymers—synthesis, cure characteristics and laminate properties//Polym. Int. John Wiley & Sons, Ltd, 2012. Vol. 62, No 7. P. n/a-n/a. an attempt to obtain PCM with a phthalonitrile matrix was described that used the oligomer with structure described by formula

| Name | Percent of substituted hydroxyl groups (%) |
|---|---|
| NLPN-1 | 44 |
| NLPN-2 | 71 |
| NLPN-3 | 87 |
| NLPN-4 | 99. |

By varying the degree of hydroxyl group substitution for phthalonitrile ones from 44 to 99% an array of resin was obtained and cured according to the following steps: holding at 100° C. for 30 min, then holding at 150° C. for 30 min, at 200° C. for 30 min, at 250° C. for 1 hour, at 300° C. for 1 hour, and finally at 350° C. for 3 hours.

A prepreg based on "T-300" carbon fabric was obtained using resin solution in methylethylketone. Sheets of prepreg were dried under vacuum at 60° C. Then the sheets were laid out in a mold and cured according to the same steps that were used for resin matrix curing. During the study the dependence of PCM properties on the phthalonitrile group content was evaluated, showing a correlation of this parameter with an increase of thermal properties and a degradation of mechanical properties of the composite material.

A paper by Augustine D., Mathew D., Reghunadhan Nair C. End-functionalized thermoplastic-toughened phthalonitrile composites: influence on cure reaction and mechanical and thermal properties//Polym. Int. John Wiley & Sons, Ltd, 2015. Vol. 64, No 1. P. 146-153 described PCM based on an oligomeric phthalonitrile resin matrix. The structures of the oligomers utilized are shown below.

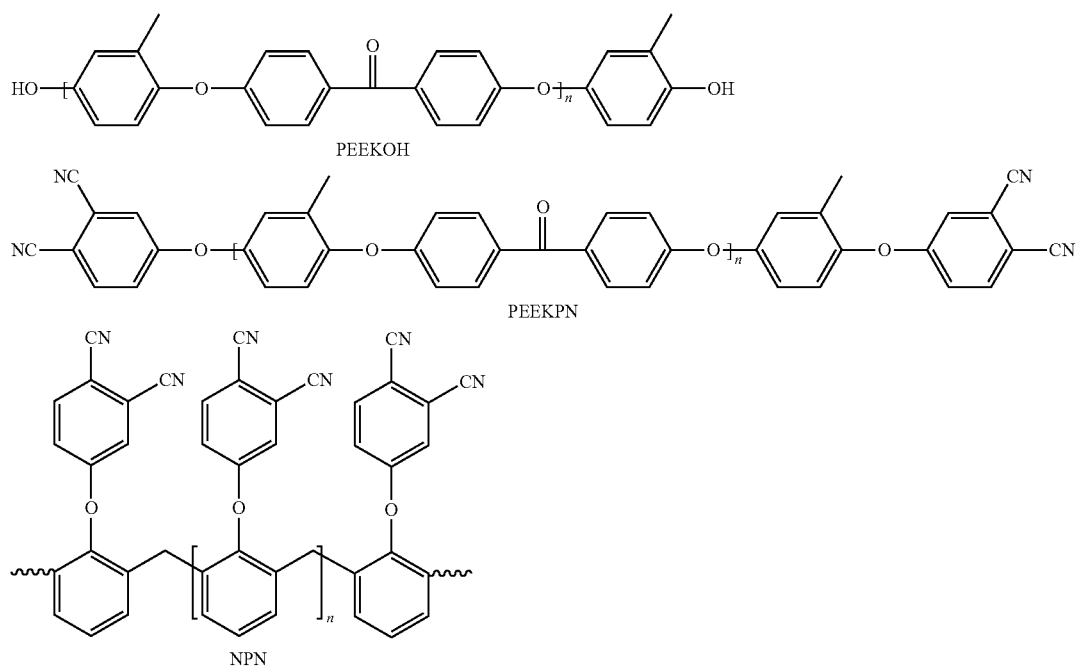

In a work by Augustine D., Mathew D., Nair C. P. R. Phenol-containing phthalonitrile polymers—synthesis, cure characteristics and laminate properties//Polym. Int. John Wiley & Sons, Ltd, 2012. Vol. 62, No 7. P. n/a-n/a. resins with composition NPN:PEEKOH=90:10, 80:20, and 70:30 (w.) and NPN:PEEKPN=80:20 (w.) containing 1 wt % of diaminediphenyl sulfone (DDS) were also obtained by mixing THF solutions of the monomers. A solution of resin in THF was used for solution impregnation process with "T-300" carbon fabric, and after drying at 60° C. a prepreg was prepared. In order to produce PCM, the prepreg was placed in a metal mold and cured via the following steps: holding at 120° C. for 30 min, then at 150° C. for 1 hour, at 200° C. for 1 hour, at 250° C. for 2 hours, at 300° C. for 3 hours, followed by 4 hours at 330° C. However, after this curing PCM would delaminate, making industrial application of these materials impossible.

In a paper by Zong L. et al. Enhanced thermal properties of phthalonitrile networks by cooperating phenyl-s-triazine moieties in backbones//Polymer (Guildf). 2015. Vol. 77. P. 177-188 it was proposed to use an oligomer with formula

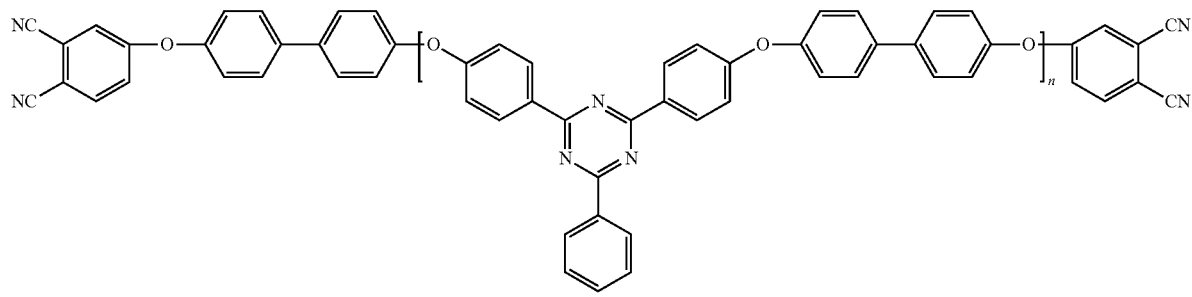

containing a triazine moiety in its core a starting material for production of PCM.

To obtain the resin matrix, curing agent p-BAPS was added to the oligomer melt at 280° C. to the concentration of 5 wt %. The melt was then cooled to room temperature, dissolved in N-methylpyrrolidone (NMP), after which a final prepreg based on carbon tape was prepared. To produce PCM, 12 layers of the prepreg were laid up in [0] direction inside a metal mold and held at 280° C. and 2.5 MPa for 2 hours. Next, the precured carbon tape composite was taken out of the mold and cured in a muffle furnace according to the following steps: holding at 250° C. for 1 hour, then holding at 285° C. for 1 hour, at 325° C. for 3 hours, at 350° C. for 2 hours, and finally at 375° C. for 8 hours.

As a result of this work, thermal and mechanical properties of the obtained PCM were studied: high thermal and thermooxidative stability were demonstrated along with room temperature tensile and flexural strengths comparable with the previously studied matrices, and a significant change of mechanical properties after temperature elevation to 450° C.

A paper by Luo Y. et al. Effect of ortho-diallyl bisphenol A on the processability of phthalonitrile-based resin and their fiber-reinforced laminates//Polym. Eng. Sci. 2016. Vol. 56, No 2. P. 150-157 proposed a resin composition based on a phthalonitrile monomer containing a benzoxazine moiety (BA-ph) and ortho-diallyl bisphenol A (DABPA):

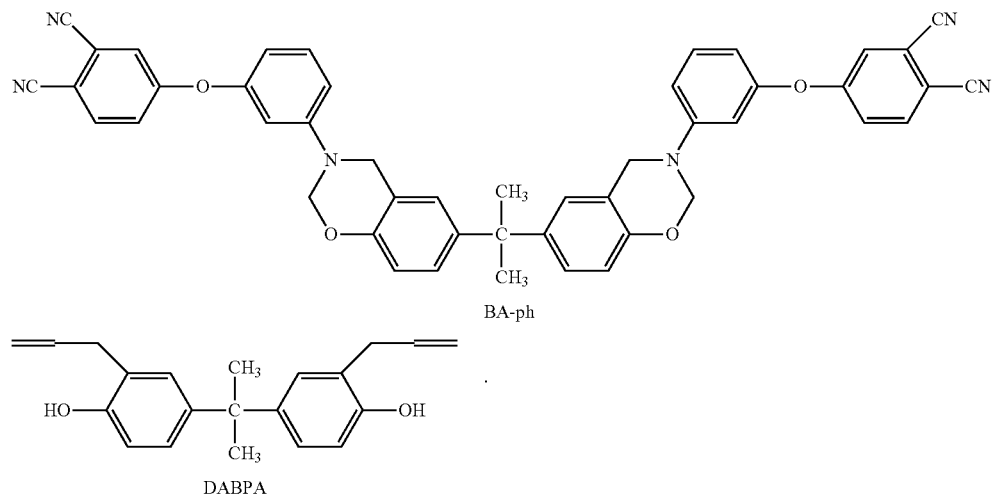

BA-ph

DABPA

This work proposed resin matrix compositions containing BA-ph and DABPA monomers in ratios of 2/1, 2/2, 2/2.5, and 2/3 named BA-ph/DABPA21, BA-ph/DABPA22, BA-ph/DABPA22.5, and BA-ph/DABPA23 respectively. To obtain the resin matrices, DABPA was added to the phthalonitrile monomer melts at 160° C. during intensive stirring until a homogenous mixture was formed, after which the mixture was cooled to room temperature. Next, the resin was dissolved in acetone and the obtained solution was used to impregnate glass fabric; the material was then air dried at room temperature for 24 hours. The resulting prepreg sheets were laid out in a metal mold, which was followed by precuring under the pressure of 20 MPA and temperature of 160° C. for 2 hours and postcuring according these steps: holding at 180° C. for 2 hours, at 200° C. for 2 hours, at 220° C. for 2 hours, at 240° C. for 2 hours, for 260° C. for 2 hours, and at 280° C. for 2 hours.

The investigation of the resulting PCM showed that the mechanical properties improved in the composite based on the mixed 2/2 resin when compared to the pure phthalonitrile one, however one must note the deterioration of the thermal and thermooxidative stability of the cured matrix with this composition. This can be seen in table 1 below.

TABLE 1

Thermal properties of PCM based on BA-ph/DABPA resin matrices

| Resin matrix/ reinforcing material | Air | | | $N_2$ | | |
|---|---|---|---|---|---|---|
| | $T_{5\%}$, °C. | $T_{10\%}$, °C. | $Y_c$ (600° C.), % | $T_{5\%}$, °C. | $T_{10\%}$, °C. | $Y_c$ (600° C.), % |
| Ba-ph/glass fabric | 419 | 490 | 82 | 417 | 480 | 78 |
| BA-ph/DABPA 21/glass fabric | 408 | 447 | 75 | 411 | 447 | 67 |
| BA-ph/DABPA 22/glass fabric | 399 | 429 | 69 | 401 | 440 | 73 |
| BA-ph/DABPA 23/glass fabric | 401 | 424 | 63 | 404 | 429 | 65 |

Additionally, selected information on the properties of PCM based on phthalonitrile matrices known from prior art are shown in table 2 below.

TABLE 2

General information on PCMs with phthalonitrile matrices known from prior art.

| Resin matrix/ reinforcing material | Tensile strength | | Flexural strength | | $\tau_{13}{}^3$, MPa | Source disclosing PCM |
|---|---|---|---|---|---|---|
| | $\sigma_{11}{}^1$, MPa | E, GPa | $\tau_{12}{}^2$, MPa | E, GPa | | |
| PN/"IM7" carbon fibers | 2000 | 183 | 2350 | 174 | 85 | Sastri S. B., Armistead J. P., Keller T. M. |
| PMR-15/"IM7" carbon fibers | 2500 | 146 | 1530 | 122 | 105 | Phthalonitrile-carbon fiber composites // Polym. Compos. Wiley Subscription Services, Inc., A Wiley Company, 1996. Vol. 17, No 6. P. 816-822. |
| PN/glass fabric (vacuum infusion) | — | — | — | — | 52 | Sastri S. B. et al. Phthalonitrile-glass fabric composites//Polym. Compos. Wiley |
| PN/glass fabric (prepreg technique) | — | — | — | — | 54 | Subscription Services, Inc., A Wiley Company, 1997. Vol. 18, No 1. P. 48-54. |
| PN + p-BAPS/"IM7" carbon fibers | 1975 | 159 | 2287 | 144 | 93 | Dominguez D. D., Jones H. N., Keller T. M. The effect of curing additive on the |
| PN + m-APB/"IM7" carbon fibers | 2000 | 183 | 2350 | 174 | 85 | mechanical properties of phthalonitrile-carbon fiber composites//Polym. Compos. Society of Plastics Engineers, 2004. Vol. 25, No 5. P. 554-561. |
| NLPN-1/"T-300" carbon fabric | 65 | — | 370 | — | 20 | Augustine D., Mathew D., Nair C. P. R. Phenol-containing phthalonitrile polymers - |
| NLPN-4/"T-300" carbon fabric | 32 | — | 250 | — | 17 | synthesis, cure characteristics and laminate properties//Polym. Int. John Wiley & Sons, Ltd, 2012. Vol. 62, No 7. P. n/a-n/a. |
| Triaz-PN/"T-300" carbon fabric | — | — | 1722 (25° C.)/ 255 (450° C.) | — | 71 (25° C.)/ 36 (450° C.) | Zong L. et al. Enhanced thermal properties of phthalonitrile networks by cooperating phenyl-s-triazine moieties in backbones// Polymer (Guildf). 2015. Vol. 77. P. 177-188. |
| BA-ph/glass fabric | — | — | 542 | 25 | — | Luo Y. et al. Effect of ortho-diallyl bisphenol |
| BA-ph:DAPBA (2:1)/glass fabric | — | — | 544 | 33 | — | A on the processability of phthalonitrile-based resin matrix and their fiber-reinforced |
| BA-ph:DAPBA (2:2)/glass fabric | — | — | 560 | 37 | — | laminates//Polym. Eng. Sci. 2016. Vol. 56, No 2. P. 150-157. |
| BA-ph:DAPBA (2:3)/glass fabric | — | — | 538 | 35 | — | | where [1]tensile strength,
[2]flexural strength,
[3]interlaminar shear strength

Moreover, synthesis of various phthalonitrile oligomers is described in research papers Laskoski M. et al. Synthesis of bisphenol A-free oligomeric phthalonitrile resins with sulfone and sulfone-ketone containing backbones//J. Polym. Sci. Part A Polym. Chem. 2016. Vol. 54, No 11. P. 1639-1646; Laskoski M. et al. Improved Synthesis of Oligomeric Sulfone-Based Phthalonitriles//Macromol. Chem. Phys. 2015. Vol. 216, No 17. P. 1808-1815; Wang J. et al. Preparation of self-promoted hydroxy-containing phthalonitrile resins by an in situ reaction//RSC Adv. The Royal Society of Chemistry, 2015. Vol. 5, No 127. P. 105038-105046; Zhang Z. et al. Self-catalyzed silicon-containing phthalonitrile resins with low melting point, excellent solubility and thermal stability//J. Appl. Polym. Sci. 2014. Vol. 131, No 20. P. n/a-n/a; Laskoski M. et al. Oligomeric aliphatic-aromatic ether containing phthalonitrile resins//J. Polym. Sci. Part A Polym. Chem. 2015. Vol. 53, No 18. P. 2186-2191 and patent documents U.S. Pat. No. 8,981,036 (US GOVERNMENT), 2014; U.S. Pat. No. 8,921,510 (THE UNITED STATES OF AMERICA AS REPRESENTED BY THE SECRETARY OF NAVY), 2014; US 2016/311976 A1 (THE GOVERNMENT OF THE UNITED STATES OF AMERICA AS REPRESENTED BY THE SECRETARY OF NAVY), 2016; WO 2016/100259 A1 (US GOVERNMENT), 23.03.2016; WO 2016190621 A1 (LG CHEMICAL LTD), 01.12.2016. The main chains of these known oligomers contain ether, silane, phosphine and sulfone bridges. The described oligomers exhibit glass transition temperatures as low as 45° C., hence it is stated that they are appropriate for using with injection methods, although this is not illustrated by examples. Furthermore, when an oligomeric linker is introduces into the bis-phthalonitrile molecule, the matrix hardness is diminished at both room and elevated temperatures thus limiting their structural applications. Young's modulus of the cured matrices based on the oligomers described in documents U.S. Pat. No. 8,981,036 and WO 2016190621 does not exceed 1400 MPa at room temperature and 200 MPa at temperatures above 200° C., while the melt viscosity is 300 mPa·s at 150° C.

It is worth noting that the possibility of implementing phthalonitrile resins for molding PCM via efficient injection methods is primarily defined by their viscosity at the impregnation temperature. To produce a resin with sufficiently low melt viscosity at processing temperature (below 500 mPa·s) it is necessary to obtain monomers with low melting points. Temperatures that do not exceed 180° C. (and preferably even below 150° C.) are considered acceptable for impregnation with phthalonitriles, for instance, temperatures in the range starting from room temperature (24-25° C.) and ending at 150° C. or in the range from 90° C. to 150° C.; these are the temperature conditions for which most supplementary materials mass produced for PCM manufacturing processes that use epoxy resins have been developed. Furthermore, lower temperatures are preferred for mass production. To assure adequate viscosity of resins, prior art describes attempts to use phthalonitrile oligomers instead of monomers (U.S. Pat. No. 8,981,036 B2 (US GOVERNMENT et. al.), 17.03.2015; U.S. Pat. No. 8,921,510 (THE UNITED STATES OF AMERICA AS REPRESENTED BY THE SECRETARY OF NAVY), 30.12.2014; US 2016/311976 A1 (THE GOVERNMENT OF THE UNITED STATES OF AMERICA AS REPRESENTED BY THE SECRETARY OF NAVY), 27.10.2016; WO 2016/100259 A1 (US GOVERNMENT), 23.03.2016; Dominguez D. D., Keller T. M. Low-melting Phthalonitrile Oligomers: Preparation, Polymerization and Polymer Properties//High Perform. Polym. SAGE Publications, 2006. Vol. 18, No 3. P. 283-304) or to introduce flexible fragments into the monomer structure, namely those containing a heteroatom (Bulgakov B. A. et al. Low-melting phthalonitrile thermosetting monomers with siloxane- and phosphate bridges//Eur. Polym. J. 2016. Vol. 84. P. 205-217; Alexander V. Babkin, Elvek B. Zodbinov, Boris A. Bulgakov, Alexey V. Kepman, and Viktor V. Avdeev. Low-melting siloxane-bridged phthalonitriles for heat-resistant matrices. European Polymer Journal, 66:452-457, 2015). Addition of a flexible fragment containing a heteroatom into the structure is more preferable as it allows to maintain the high glass transition (heat deflection) temperature of the cured matrices, while for oligomers this parameter deteriorates greatly in comparison to the classic phthalonitriles due to matrix plasticization by the oligomeric fragments (Laskoski M. et al. Oligomeric aliphatic-aromatic ether containing phthalonitrile resins//J. Polym. Sci. Part A Polym. Chem. 2015. Vol. 53, NM 18. P. 2186-2191).

Additionally, prior art describes attempts to improve the phthalonitrile resin matrix properties by creating more complex compositions on their basis.

For example, document RU 2638307 (ZAKRYTOE AKTSIONERNOE OBSHCHESTVO "INSTITUT NOVYKH UGLERODNYKH MATERIALOV I TEKHNOLOGII" (ZAO "INUMIT")), 15.12.2017 discloses phosphorus-containing monomers with the general formula

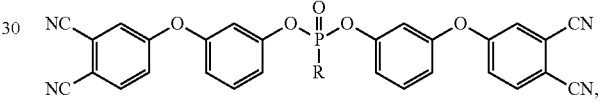

methods for their synthesis, as well as resin matrices made from these monomers and aromatic amines.

However, application of the resins described in RU 2638307 as matrices is hindered by the high resource demand of their production and the large amount of byproducts accompanying the process.

A research paper by B. A. Bulgakov, A. V. Babkin, P. B. Dzhevakov, A. A. Bogolyubov, A. V. Sulimov, A. V. Kepman, Yu G. Kolyagin, D. V. Guseva, A. Yu Rudyak, and A. V. Chertovich. Low-melting phthalonitrile thermosetting monomers with siloxane- and phosphate bridges. European Polymer Journal, (84):205-217, 2016 discloses synthesis of phosphorus-containing monomers with the general formula

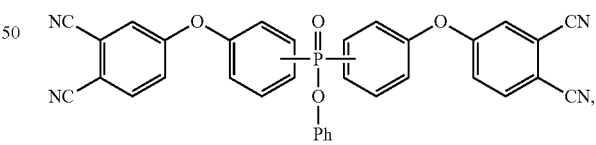

as well as their polymerization in the presence of 1,3-bis(4-diaminophenoxy)benzene where either only the monomers with the formula above were used, or they were mixed with monomers with formula

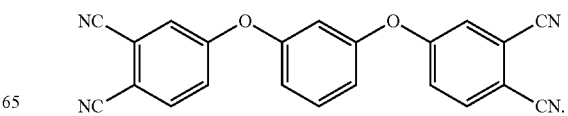

The publication provides thermal and mechanical properties of the obtained polymers which indicate that these materials have the same disadvantages as the resins described in RU 2638307. The process for producing the polymers disclosed in this paper is fairly resource-demanding, and a large amount of waste is formed as a result. Moreover, the high-melting monomer tends to crystalize out of the mixed resins containing co-monomers described in this paper, and the mixes also have high viscosities, making their application as matrices for injection methods of PCM fabrication (including vacuum infusion and resin transfer molding (RTM)) troublesome.

Document WO2016064298 (ZAKRYTOE AKTSIONERNOE OBSHCHESTVO "INSTITUT NOVYKH UGLERODNYKH MATERIALOV I TEKHNOLOGII"), 28.04.2016 discloses low-melting silicon-containing monomers, their synthesis method, and a resin composed from these monomers and aromatic amines. The disadvantage of the resin matrix based on the low-melting silicon-containing monomers described in this document is that using silicon-containing monomers leads to degradation of the mechanical properties of the cured matrix. For example, the Young's modulus for the polymer obtained by heating 4,4'-(((((phenyl(methyl)silanediil)bis(oxy))bis(methylene))bis(4,1-phenylene))bis(oxy))diphthalonitrile in the presence of an organic diamine was 2.6 GPa (B. A. Bulgakov, A. V. Babkin, A. A. Bogolyubov, E. S. Afanasyeva, and A. V. Kepman. Mechanical and physicochemical properties of matrices for fiber reinforced plastics based on lowmelting phthalonitrile monomers. Russian Chemical Bulletin, (1):287-290, 2016). Furthermore, synthesis of the silicon-containing bis-phthalonitriles described in document WO2016064298 includes three stages and requires expensive reagents.

Research paper B. A. Bulgakov, A. V. Sulimov, A. V. Babkin, I A Timoshkin, A V Solopchenko, A V Kepman, and V V Avdeev. Phthalonitrile-carbon fiber composites produced by vacuum infusion process. Journal of Composite Materials, 2017, DOI: 10.1177/0021998317699452 discloses production of carbon-reinforced plastics by vacuum infusion using phthalonitrile resin matrix compositions containing the following components:

monomer 1,3-bis(3,4-dicyanophenoxy)benzene:

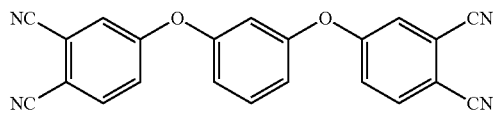 [SMILES: N#Cc1ccc(Oc2cccc(Oc3ccc(C#N)c(C#N)c3)c2)cc1C#N]

co-monomer bis(3-(3,4-dicyanophenoxy)phenyl) phenylphosphate:

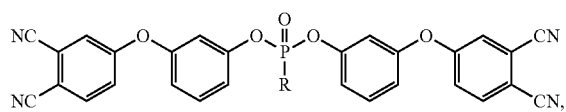

initiator 1,3-bis(4-diaminophenoxy)benzene, and resins that along with the aforementioned components also contain plasticizer 4-[3-(prop-2-ene-1-yloxy)phenoxy]benzene-1,2-dicarbonitrile:

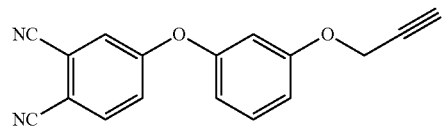 [SMILES: C#CCOc1cccc(Oc2ccc(C#N)c(C#N)c2)c1]

Moreover, properties of such resins are presented: rheological (viscosity), together with thermal and mechanical properties of the cured matrices obtained on their basis. Properties of the produced composites are shown. The disadvantages on the approach shown in this publication include crystallization of high-melting components during impregnation and minimum melt viscosities above 300 mPa·s, which makes it hard to produce large parts with complex shape, thus canceling out the advantages of infusion over other methods.

A publication by Boris A. Bulgakov, Artem V. Sulimov, Alexander V. Babkin, Dmitry V. Afanasiev, Alexander V. Solopchenko, Ekaterina S. Afanaseva, Alexey V. Kepman, and Viktor V. Avdeev. Flame-retardant carbon fiber reinforced phthalonitrile composite for high-temperature applications obtained by resin transfer molding. Mendeleev Communications, 27(3):257-259, 2017 discloses the process for producing carbon-reinforced plastics by RTM using a resin containing the following monomers: 1,3-bis(3,4-dicyanophenoxy)benzene, bis(3-(3,4-dicyanophenoxy)phenyl)phenylphosphate, and silicon-containing phthalonitrile from pat. appl. WO 2016064298, as well as initiator 1,3-bis(4-diaminophenoxy)benzene. Mechanical and fire-resistant properties of the obtained material are shown. While the resin disclosed in this research paper is suitable for application in the vacuum infusion process, during its production silicon-containing monomers were used, and their synthesis, as has been noted above, is a multistep and very resource-demanding process. Furthermore, the presented mechanical properties of the material are significantly worse than those on other known carbon-reinforced plastics with phthalonitrile matrices, including those obtained from prepregs via solution impregnation process (Sastri S. B., Armistead J. P., Keller T. M. Phthalonitrile-carbon fiber composites//Polym. Compos. Wiley Subscription Services, Inc., A Wiley Company, 1996. Vol. 17, No 6. P. 816-822).

Document US 2016/0168327 A1 discloses composition of a phthalonitrile resin matrix that is the closest analog of the proposed invention and is comprised of a diphthalonitrile monomer, a reactive plasticizer (mono-phalonitrile), and an aromatic diamine. Also, a composition containing a diphthalonitrile monomer, a non-reactive plasticizer (mono-phthalonitrile), and an aromatic diamine is disclosed. However, this composition cures at temperatures of 220-250° C., which does not allow to use it for molding composite materials via vacuum infusion as this method is typically used and is optimized for obtaining polymer composite materials based on epoxy resins, and the supplementary materials for infusion are meant to be utilized at temperatures under 200° C., not above.

Additionally, the compositions described in this document have high viscosity of 10-50 Pa·s, which makes them poorly suitable for use in vacuum infusion process for polymer composite materials fabrication. While document US 2016/

0168327 does state that the polymer compositions described in it are suitable for vacuum infusion, it does not contain examples proving this statement. Furthermore, one should keep in mind that according to prior art the maximum allowed viscosity value for resin transfer molding and vacuum infusion is 0.8 Pa·s (ASM Handbook Volume 21: Composites, Editor: D. B. Miracle and S. L. Donaldson, ASM International, 2001, chapter Resin Transfer Molding and Structural Reaction Injection Molding by C. D. Rudd, University of Nottingham), and the viscosity of the compositions disclosed in US 2016/0168327, as can be noted from this document, exceeds this maximum value.

Therefore, the solutions related to resin matrix compositions meant for forming matrices in PCM known from prior art have a number of disadvantages. Thus prior art presents a need for development of new resin compositions that would exhibit all advantages of the compositions based on phthalonitrile monomers (such as melt viscosities below 300 mPa·s at the impregnation temperature, pot-life of at least 6 hours at the impregnation temperature, gelation time below 12 hours at the curing temperature (below 180° C.), high heat resistance of the cured matrix (E (Young's modulus of the material) of at least 1 GPa at 400° C., $T_5\%$ (temperature at which 5% of the weight is lost during thermogravimetric testing) of no less than 450° C., limiting oxygen index (LOI) of 40% or above), but at the same time lacking their disadvantages (high melting point typical for classic phthalonitrliles (180-240° C.), low Young's moduli characteristic for matrices based on phthalonitrile oligomers (no more than 2.5 GPa at room temperature), acceptable melt viscosities that can only be reached at temperatures above 200° C. at which polymerization occurs very rapidly); more efficient processes for their manufacturing that would require fewer steps and fewer resources; and less resource-demanding methods for curing resin matrices for PCM; composite materials with high thermal stability obtained using said resin matrices, and methods for manufacturing such materials.

SUMMARY OF THE INVENTION

The technical purpose of the present invention is to offer new compositions of resins as matrices for polymer composite materials (PCM) which after curing will possess high thermal stability at temperatures up to 450° C. and at the same time the uncured resins will have melting points or glass transition temperatures of no more than 50° C., preferably of or below 25° C., exhibit melt viscosity values below 800 mPa·s in the temperature range from 100 to 180° C. and below 300 mPa·s in the range from 120 to 180° C., preferably no more than 300 mPa·s in the range from 100 to 180° C. and no more than 100 mPa·s in the range from 120 to 180° C., to provide new methods for producing such compositions that would require fewer steps and resources compared to analogous processes known from prior art, new composite materials manufactured from the aforementioned resins and possessing high thermal stability as well as methods for obtaining such materials that require fewer resources compared to the analogous processes known from prior art.

This invention provides a composition of a resin matrix that is intended for production matrices for PCM or prepregs and comprises:
1) a polymerizable mixture comprising:
   one or more bis-phthalonitrile monomers selected from monomers with the general formula

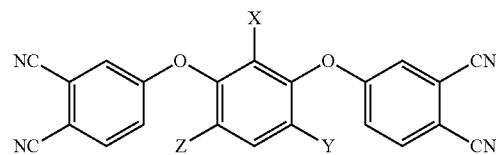

where X, Y, Z are independently selected from the group consisting of H, F, Cl, Br, and $CH_3$, making up 20-94 wt % of the polymerizable mixture, one or more reactive plasticizers-fire retardants selected from compounds with the general formula

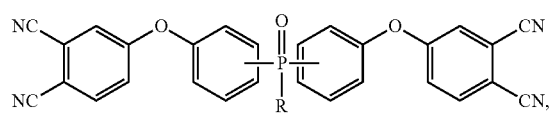

where group

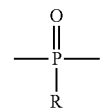

can be in either meta- or para-position relative to the oxygen atom bonded to the benzene ring, and R is an aryl, oxyaryl, alkyl, or oxyalkyl group
or the general formula

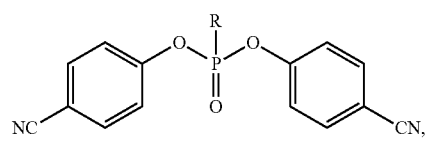

where R is selected from aryl, oxyaryl, alkyl, or oxyalkyl group, in an amount of 5 to 80 wt % of the polymerizable mixture, one or more reactive diluents selected from compounds with the general formula

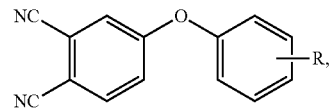

where R can be in meta- or para-position relative to the oxygen atom bonded to the benzene ring and is either H, CN, $NH_2$, or $N(C_3H_3)_2$, the reactive diluents comprising 1 to 50% of total weight of the polymerizable mixture; and
2) polymerization initiator (curing agent) comprising 1 to 20 wt % of total weight of the polymerization mixture, the polymerization initiator selected from aromatic diamines or bisphenols having a boiling point of at least 180° C. at 0.1 mm Hg vacuum; the total content of polymerizable mixture and curing agent should make up 60-100 wt % of total resin matrix weight.

Also presented is a method for obtaining a resin matrix composition for PCM in agreement with the invention that includes mixing in a reactor a polymerizable mixture comprising:

one or more bis-phthalonitrile monomers selected from monomers with the general formula

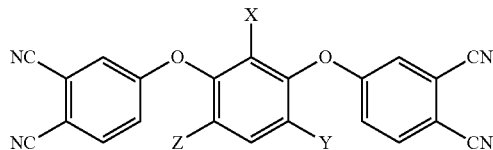

where X, Y, Z are independently selected from the group consisting of H, F, Cl, Br, and $CH_3$, in an amount 20 to 94 wt % of the polymerizable mixture, one or more reactive plasticizers-fire retardants selected from compounds with the general formula

where group

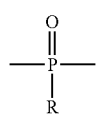

can be in either meta- or para-position relative to the oxygen atom bonded to the benzene ring, and R is an aryl, oxyaryl, alkyl, or oxyalkyl group or the general formula

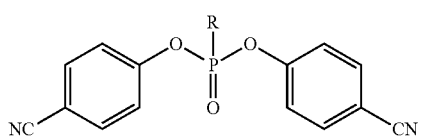

where R is selected from aryl, oxyaryl, alkyl, or oxyalkyl group, the reactive plasticizers-fire retardants comprising 5 to 80 wt % of the polymerizable mixture, one or more reactive diluents selected from compounds with the general formula

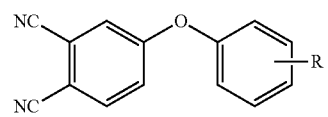

where R can be in meta- or para-position relative to the oxygen atom bonded to the benzene ring and is either H, CN, $NH_2$, or $N(C_3H_3)_2$, reactive diluents comprising 1 to 50% of total weight of the polymerizable mixture and applying vacuum to the resulting mixture and heating it to 100-180° C. until the mixture is fully homogenized (undissolved components are not present), adding a polymerization initiator selected from aromatic diamines or bisphenols having boiling point of at least 180° C. at 0.1 mm Hg vacuum in an amount of 1 to 20 wt % of the total weight of the polymerizable mixture to the obtained homogeneous mixture, stirring of thus obtained mixture at 100-160° C. for 5-180 minutes, discharging of the resulting composition from the reactor without cooling followed by allowing the composition to cool.

Also presented is a method for obtaining a resin matrix composition for fabricating prepregs for producing PCM in agreement with the invention which includes mixing in a reactor a polymerizable mixture comprising one or more bis-phthalonitrile monomers selected from monomers with the general formula

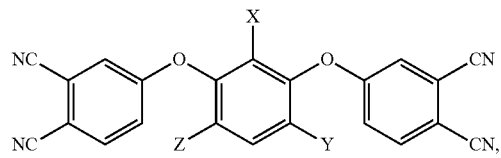

where X, Y, Z are independently selected from the group consisting of H, F, Cl, Br, and $CH_3$, in an amount of 20 to 94 wt % of the polymerizable mixture, one or more reactive plasticizers-fire retardants selected from compounds with the general formula

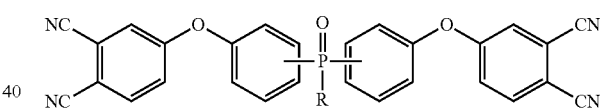

where group

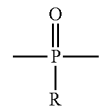

can be in either meta- or para-position relative to the oxygen atom bonded to the benzene ring, and R is an aryl, oxyaryl, alkyl, or oxyalkyl group or the general formula

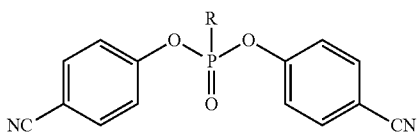

where R is selected from aryl, oxyaryl, alkyl, or oxyalkyl group, the reactive plasticizers-fire retardants comprising 5 to 80 wt % of the polymerizable mixture, and one or more reactive diluents selected from compounds with the general formula

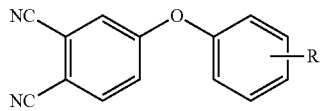

where R can be in meta- or para-position relative to the oxygen atom bonded to the benzene ring and is either H, CN, NH$_2$, or N(C$_3$H$_3$)$_2$, the reactive diluents comprising 1 to 50% of total weight of the polymerizable mixture, more specifically, the plasticizer and the diluent are added to the reactor first, heating to 100-140° C. is carried out until the components are liquefied, after which the mixing is initiated and dry powdered monomer is added but not allowed to dissolve, adding the polymerization initiator selected from aromatic diamines or bisphenols having a boiling point of at least 180° C. at 0.1 mm Hg vacuum in an amount of 1 to 20 wt % of the total weight of the polymerizable mixture to the obtained suspension, stirring of thus obtained mixture at 100-160° C. for 5-180 minutes, discharging of the resulting composition from the reactor without cooling followed by allowing the composition to cool.

Additionally, there is a method provided for curing the said resin matrix composition, which includes steps during which the resin matrix composition is degassed under vacuum by stirring under pressure of no more than 1333 Pa at a temperature in the range of 100 to 180° C., the obtained degassed material is heated to a temperature in the range of 180 to 190° C. and kept at this temperature for 1-12 hours until cured, after which the obtained product is subjected to final curing (post-curing) by heating in a way that avoids resin matrix transition from glass to rubbery state (devitrification) by maintaining the heating temperature at every point at a level below glass transition temperature of the matrix. The preferred method of the invention embodiment is to heat up the material at the rate of 10° C./min-10° C./hour to the temperature in the range of 250 to 375° C. and hold it at that temperature for 2-12 hours, notably the post curing can be carried out in the mold or without it.

The object of the invention is a polymer composite material containing a carbon material and a resin matrix, which is distinguished by the fact that it uses the resin matrix composition prepared according to the invention to impregnate the carbon material, the impregnation is carried out at a temperature within the range of 100 to 160° C., and curing of the resin matrix composition is performed according to the method above. It is preferred to carry out carbon material impregnation by vacuum infusion, to which end N layers (minimum two, the maximum number is not limited and only determined by the volume and structure of the fabricated part and/or mold used) of carbon fabric are placed in a mold, packed in a vacuum bag, and the carbon material is impregnated at a temperature in the range of 100 to 140° C. Chopped (discrete) carbon fiber, unidirectional carbon tape, carbon fabric with two-dimensional or three-dimensional weaving can be used as the carbon material for this method.

The invention also includes a polymer composite material obtained using the said resin matrix composition.

The technical result of the technical decisions proposed in the present application consists in enabling production of resin matrix compositions for polymer composite materials (PCM) which after curing possess high thermal stability at temperatures up to 450° C., but also have melting points or glass transition temperatures of no more than 50° C. which also allows melt viscosity values below 800 mPa·s in the temperature range from 100 to 180° C., and below 300 mPa·s in the temperature range from 120 to 180° C., offering new methods for producing such resin matrix compositions that require fewer steps and resources, bringing about new composite materials obtained using aforementioned resins and possessing high thermal stability, and also providing methods for fabricating such materials that require fewer steps and resources than the analogous processes known from prior art. Polymer composite materials obtained using resins matrix compositions according to the invention maintain 70% or more of their mechanical properties such as compression strength, tensile strength, Young's modulus, interlaminar shear strength, in-plane shear strength, etc. at temperatures up to 450° C. compared to these parameters at room temperature and possess of LOI≥70%.

Therefore, one aspect of the invention relates to the resin matrix composition meant for production of PCM or prepregs for PCM comprising:

1) polymerizable mixture comprising:
one or more bis-phthalonitrile monomers selected from monomers with the general formula

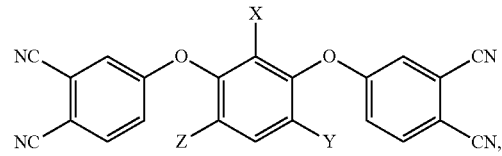

where X, Y, Z are independently selected from the group consisting of H, F, Cl, Br, and CH$_3$, in an amount of 20 to 94 wt % of the polymerizable mixture, one or more reactive plasticizers-fire retardants selected from compounds with the general formula

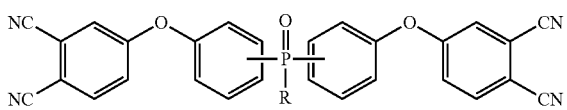

where group

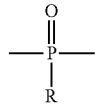

can be in either meta- or para-position relative to the oxygen atom bonded to the benzene ring, and R is an aryl, oxyaryl, alkyl, or oxyalkyl group or the general formula

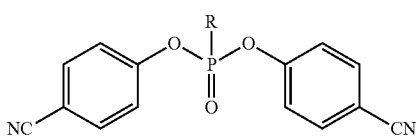

where R is selected from aryl, oxyaryl, alkyl, or oxyalkyl group, the reactive plasticizers-fire retardants comprising 5-80 wt % of the polymerizable mixture, and one or more reactive diluents selected from compounds with the general formula

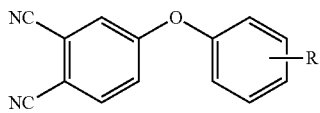

where R can be in meta- or para-position relative to the oxygen atom bonded to the benzene ring and is either H, CN, $NH_2$, or $N(C_3H_3)_2$, the reactive diluents comprising 1 to 50% of total weight of the polymerizable mixture; and 2) polymerization initiator (curing agent) comprising 1 to 20 wt % of total weight of the polymerization mixture selected from aromatic diamines or bisphenols having boiling point of at least 180° C. at 0.1 mm Hg vacuum; the total content of polymerizable mixture and curing agent should make up 60-100 wt % of total resin matrix weight.

In the preferred embodiment, the polymerizable mixture contains one or more reactive diluents in the amount from 1 to 40 wt % of the total mixture weight or from 10 to 50 wt % of the total mixture weight, or from 10 to 40 wt % of the total mixture weight, or from 20 to 40 wt % of the total mixture weight, or from 20 to 35 wt % of the total mixture weight, or from 20 to 30 wt % of the total mixture weight, preferably from 10 to 40 wt % of the total mixture weight, or from 10 to 30 wt % of the total mixture weight.

In the preferred embodiment, the reactive diluent is selected from one or more compounds from the group consisting of 4-(4-cyanophenoxy)-benzene-1,2-dicarbonitrile, 4-(4-cyanophenoxy)-phthalonitrile, 4-(3-cyanophenoxy)-phthalonitrile, and 4-(4-aminophenoxy)-phthalonitrile, particularly preferably one or more compounds, 4-(4-cyanophenoxy)-benzene-1,2-dicarbonitrile, 4-[3-(dipropargylamino)phenoxy]phthalonitrile, 4-[4-(dipropargylamino)phenoxy]phthalonitrile.

In the preferred embodiment, the aryl is an optionally substituted aryl $C_6$-$C_{20}$, preferably aryl $C_6$-$C_{18}$, even more preferred is an unsubstituted aryl $C_{6-10}$ or a substituted aryl $C_6$ where the substituent can be a methyl, fluoro, chloro, bromo or trifluoromethyl group, it is preferred if the aryl is a phenyl; the oxyaryl is —O($C_6$-$C_{20}$), preferably oxyaryl —O($C_6$-$C_{18}$), most preferably unsubstituted oxyaryl —O($C_{6-10}$) or substituted oxyaryl —O($C_6$) where the substituent can be a methyl, fluoro, chloro, bromo, or trifluoromethyl group, it is preferred if the oxyaryl is an oxyphenyl; the alkyl is a straight-chain or branched-chain alkyl $C_1$-$C_8$, preferably alkyl $C_2$-$C_6$, most preferably alkyl $C_3$-$C_4$; the oxyalkyl is a straight-chain or branched-chain oxyalkyl —O($C_1$-$C_8$), preferably oxyalkyl —O($C_2$-$C_6$), most preferably oxyalkyl —O($C_3$-$C_4$).

In the preferred embodiment, the monomer is selected from one or more compounds from the group consisting of 1,3-bis-(3,4-dicyanophenoxy)benzene, 1,3-bis-(3,4-dicyanophenoxy)-2-fluorobenzene, 1,3-bis-(3,4-dicyanophenoxy)-4-fluorobenzene, 1,3-bis-(3,4-dicyanophenoxy)-2-chlorobenzene, 1,3-bis-(3,4-dicyanophenoxy)-4-chlorobenzene, 1,3-bis-(3,4-dicyanophenoxy)-2-bromobenzene, 1,3-bis-(3,4-dicyanophenoxy)-4-bromobenzene, 1,3-bis-(3,4-dicyanophenoxy)-2,4-difluorobenzene, 1,5-bis-(3,4-dicyanophenoxy)-2,4-dichlorobenxene, 1,3-bis-(3,4-dicyanophenoxy)-2-methylbenzene, more preferably from 1,3-bis-(3,4-dicyanophenoxy) benzene, 1,3-bis-(3,4-dicyanophenoxy)-2-fluorobenzene, 1,3-bis-(3,4-dicyanophenoxy)-4-fluorobenzene, 1,3-bis-(3,4-dicyanophenoxy)-2,4-difluorobenzene, the most preferred is use of 1,3-bis-(3,4-dicyanophenoxy) benzene.

In the preferred embodiment, the reactive plasticizer-fire retardant is selected from one or more compounds from the group consisting of bis-(4-cyanophenoxy)-phenylphosphate, bis-(3-(3,4-dicyanophenoxy)-phenylphosphate, bis-(3-(3,4-dicyanophenoxy)-1-naphthylphosphate, bis-(4-cyanophenoxy)-phenylphosphonate, bis-(3-(3,4-dicyanophenoxy)phenyl)-phenylphosphonate, bis-(3-(3,4-dicyanophenoxy)phenyl)-isopropylphosphate, bis-(3-(3,4-dicyanophenoxy)phenyl)-butylphosphate, bis-(3-(3,4-dicyanophenoxy)phenyl)-propargylphosphate, bis-(4-cyanophenyl)phenylphosphate, bis-(3-cyanophenoxy) phenylphosphate and bis-4-(3,4-dicyanophenoxy)phenyl) phenylphosphate, more preferably from bis-(4-cyanophenoxy)-phenylphosphate, bis-(3-(3,4-dicyanophenoxy)-phenylphosphate, bis-(3-(3,4-dicyanophenoxy)phenyl)-isopropylphosphate, bis-(3-(3,4-dicyanophenoxy)phenyl)-butylphosphate.

In the preferred embodiment, the curing agent is selected from the following compounds:

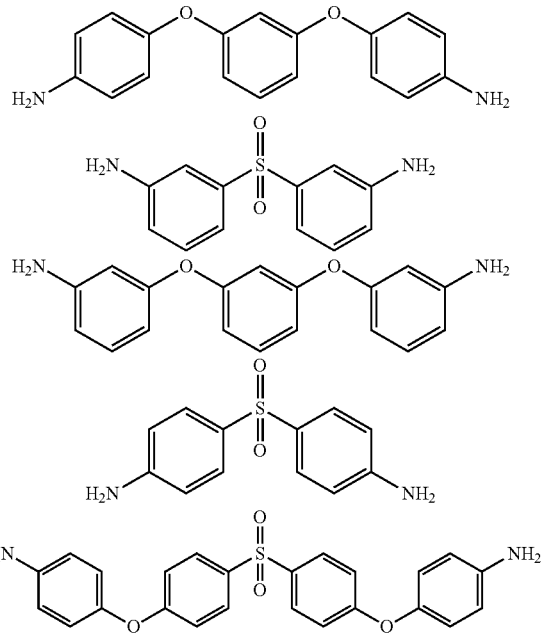

or compounds with the general formula

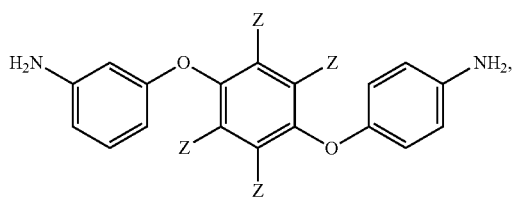

where Z stands for H or F, or from the compounds with the general formula

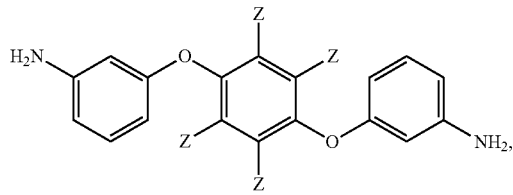

where Z stands for H or F, or bisphenols, or more preferably from 1,3-bis-(4-aminophenoxy)benzene, 4,4'-diaminodiphenylsulfone, 3,3'-diaminodiphenylsulfone, 3,3'-[(2,3,5,6-tetrafluorobenz-1,4-diyl)bis(oxy)]dianiline, 4,4'-[(2,3,5,6-tetrafluorobenz-1,4-diyl)bis(oxy)]dianiline, bis[4-(4-aminophenoxy)phenyl]sulfone or bisphenol A, most preferably from 1,3-bis-(4-aminophenoxy)benzene, or bis[4-(4-aminophenoxy)phenyl]sulfone.

In the preferred embodiment, the monomer is used in the amount of 20-80 wt % of the polymerizable mixture weight or 30-80 wt % of the polymerizable mixture weight, or 20-70 wt % of the polymerizable mixture weight, or 30-70 wt % of the polymerizable mixture weight, or 40-70 wt % of the polymerizable mixture weight, or 40-60 wt % of the polymerizable mixture weight, or 40-55 wt % of the polymerizable mixture weight, preferably in the amount of 30-70 wt % of the polymerizable mixture weight.

In the preferred embodiment, the plasticizer is used in the amount of 5-70 wt % of the total polymerizable mixture weight, or in the amount of 5-60 wt % of the total polymerizable mixture weight, or in the amount of 20-70 wt % of the total polymerizable mixture weight, or in the amount of 20-60 wt % of the total polymerizable mixture weight, or in the amount of 25-60 wt % of the total polymerizable mixture weight, or in the amount of 25-50 wt % of the total polymerizable mixture weight, or in the amount of 30-60 wt % of the total polymerizable mixture weight, or in the amount of 30-50 wt % of the total polymerizable mixture weight.

In the preferred embodiment, the curing agent is used in the amount from 2 to 20 wt % of the total polymerizable mixture weight, or from 5 to 20 wt % of the total polymerizable mixture weight, or from 5 to 15 wt % of the total polymerizable mixture weight, or preferably from 5 to 10 wt % of the total polymerization mixture weight.

In the preferred embodiment, the prepreg resin matrix composition also contains an inert filler selected from quartz powder, carbon black, barium sulfate, metal phthalocyanides, pyrogenic silica, titanium oxide, and any mixture of at least two of said materials in the amount up to 40 wt % of the total resin matrix weight or in the amount of 9-30 wt % of the total resin matrix weight, or in the amount of 9-28 wt % of the total resin matrix weight. Addition of the filler allows to lower the matrix shrinkage during curing, along with lowering the cost of the prepreg by decreasing the specific share of the polymer.

Another aspect of the invention relates to a method for obtaining a resin matrix composition for fabrication of a polymer composite material (PCM) according to the invention that includes obtaining in a reactor a polymerizable mixture consisting of:

one or more bis-phthalonitrile monomers selected from monomers with the general formula

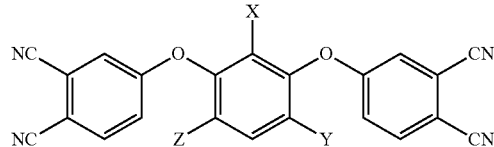

where X, Y, Z are independently selected from the group consisting of H, F, Cl, Br, and $CH_3$, in an amount of 20 to 94 wt % of the polymerizable mixture, one or more reactive plasticizers-fire retardants selected from compounds with the general formula

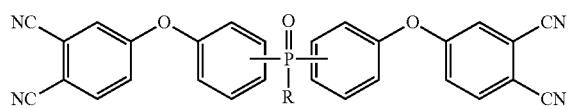

where group

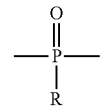

can be in either meta- or para-position relative to the oxygen atom bonded to the benzene ring, and R is an aryl, oxyaryl, alkyl, or oxyalkyl group
or the general formula

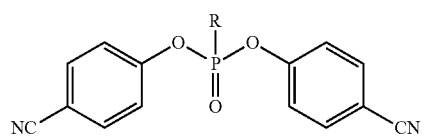

where R is selected from aryl, oxyaryl, alkyl, or oxyalkyl group, the reactive plasticizers-fire retardants comprising 5 to 80 wt % of the polymerizable mixture, and
one or more reactive diluents selected from compounds with the general formula

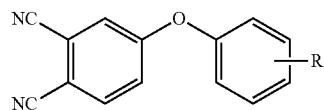

where R can be in meta- or para-position relative to the oxygen atom bonded to the benzene ring and is either H, CN, $NH_2$, or $N(C_3H_3)_2$, to the reactive diluents comprising 1 to 50% of total weight of the polymerizable mixture,
and
applying vacuum to the resulting mixture and heating it to 100-180° C. until the mixture is fully homogenized (undissolved components are not present),
addition of the polymerization initiator selected from aromatic diamines or bisphenols having boiling point of at least 180° C. at 0.1 mm Hg vacuum in an amount of 1 to 20 wt % of the total weight of the polymerizable mixture to the obtained homogeneous mixture, stirring of thus obtained mixture at 100-160° C. for 5-180 minutes, discharging of the resulting composition from the reactor without cooling followed by allowing the composition to cool.

In the preferred embodiment, one or more active diluents mentioned above are added to the polymerizable mixture in the amount of 1-40 wt % of the total mixture weight or 10-50 wt % of the total mixture weight, or 10-40 wt % of the total mixture weight, or 20-40 wt % of the total mixture weight, or 20-35 wt % of the total mixture weight, or 20-30 wt % of the total mixture weight, preferably from 10 to 40 wt % of the total mixture weight, or in the amount from 10 to 30 wt % of the total mixture weight.

In the preferred embodiment, the reactive diluent is selected from one or more compounds from the group consisting of 4-[4-(dipropargylamino)phenoxy]phthalonitrile, 4-[3-(dipropargylamino)phenoxy]phthalonitrile, 4-(4-cyanophenoxy)-phthalonitrile, 4-(3-cyanophenoxy)-phthalonitrile and 4-(4-aminophenoxy)-phthalonitrile, 4-(3-aminophenoxy)-phthalonitrile, especially preferably from 4-(4-cyanophenoxy)-phthalonitrile, 4-[3-(dipropargylamino)phenoxy]phthalonitrile and 4-(4-aminophenoxy)-phthalonitrile.

In the preferred embodiment, the aryl is an optionally substituted aryl $C_6$-$C_{20}$, preferably aryl $C_6$-$C_{18}$, more preferably unsubstituted aryl $C_{6-10}$ or substituted aryl $C_6$, where the substituent can be a methyl, fluoro, chloro, bromo, or trifluoromethyl group, it is preferred if the aryl is a phenyl; the oxyaryl is an oxyaryl —O($C_6$-$C_{20}$), preferably oxyaryl —O($C_6$-$C_{18}$), more preferably unsubstituted oxyaryl —O($C_{6-10}$) or substituted oxyaryl —O($C_6$), where the substituent can be a methyl, fluoro, chloro, bromo, or trifluoromethyl group, it is preferred if the oxyaryl is an oxyphenyl; the alkyl is a straight-chain or branched-chain alkyl $C_1$-$C_8$, preferably alkyl $C_2$-$C_6$, most preferably alkyl $C_3$-$C_4$; the oxyalkyl is a straight-chain or branched-chain oxyalkyl —O($C_1$-$C_8$), preferably oxyalkyl —O($C_2$-$C_6$), most preferably oxyalkyl —O($C_3$-$C_4$).

In the preferred embodiment, the monomer is selected from one or more compounds from the group consisting of 1,3-bis-(3,4-dicyanophenoxy) benzene, 1,3-bis-(3,4-dicyanophenoxy)-2-fluorobenzene, 1,3-bis-(3,4-dicyanophenoxy)-4-fluorobenzene, 1,3-bis-(3,4-dicyanophenoxy)-2-chlorobenzene, 1,3-bis-(3,4-dicyanophenoxy)-4-chlorobenzene, 1,3-bis-(3,4-dicyanophenoxy)-2-bromobenzene, 1,3-bis-(3,4-dicyanophenoxy)-4-bromobenzene, 1,3-bis-(3,4-dicyanophenoxy)-2,4-difluorobenzene, 1,5-bis-(3,4-dicyanophenoxy)-2,4-dichlorobenzene, 1,3-bis-(3,4-dicyanophenoxy)-2-methylbenzene, more preferably from 1,3-bis-(3,4-dicyanophenoxy) benzene, 1,3-bis-(3,4-dicyanophenoxy)-2-fluorobenzene, 1,3-bis-(3,4-dicyanophenoxy)-4-fluorobenzene, 1,3-bis-(3,4-dicyanophenoxy)-2,4-difluorobenzene, it is most preferred to use 1,3-bis-(3,4-dicyanophenoxy) benzene.

In the preferred embodiment, the reactive plasticizer-fire retardant is selected from one or more compounds from the group consisting of bis-(4-cyanophenoxy)-phenylphosphate, bis-(3-(3,4-dicyanophenoxy)-phenylphosphate, bis-(3-(3,4-dicyanophenoxy)-1-naphthylphosphate, bis-(4-cyanophenoxy)-phenylphosphonate, bis-(3-(3,4-dicyanophenoxy)phenyl)-phenylphosphonate, bis-(3-(3,4-dicyanophenoxy)phenyl)-isopropylphosphate, bis-(3-(3,4-dicyanophenoxy)phenyl)-butylphosphate, bis-(3-(3,4-dicyanophenoxy)phenyl)-propargylphosphate, bis-(4-cyanophenyl)phenylphosphate, bis-(3-cyanophenoxy)phenylphosphate and bis-4-(3,4-dicyanophenoxy)phenyl)phenylphosphate, more preferably from bis-(4-cyanophenoxy)-phenylphosphate, bis-(3-(3,4-dicyanophenoxy)-phenylphosphate, bis-(3-(3,4-dicyanophenoxy)phenyl)-isopropylphosphate, bis-(3-(3,4-dicyanophenoxy)phenyl)-butylphosphate.

In the preferred embodiment, the curing agent is selected from the following compounds:

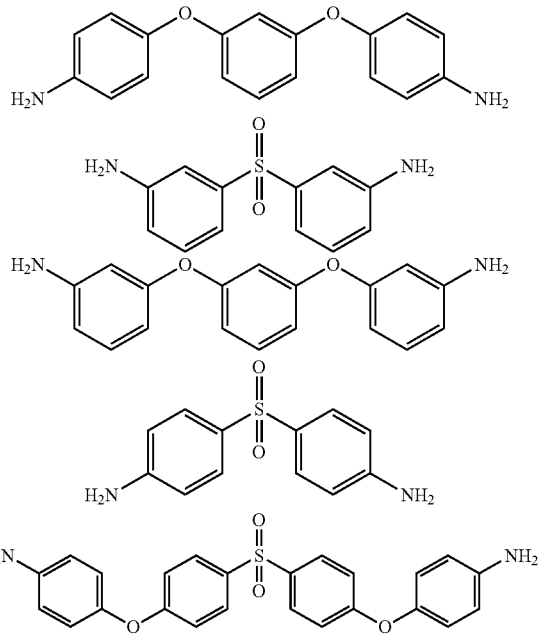

or from the compounds with the general formula

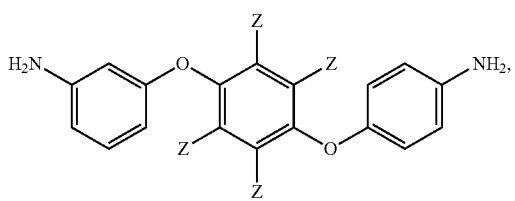

where Z stands for H or F, or from the compounds with the general formula

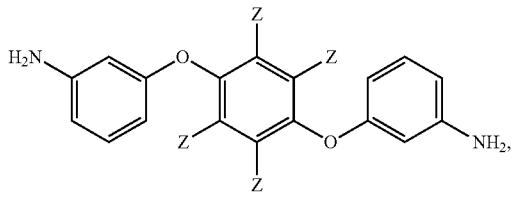

where Z stands for H or F, or bisphenols, or more preferably from 1,3-bis-(4-aminophenoxy)benzene, 4,4'-diaminodiphenylsulfone, 3,3'-diaminodiphenylsulfone, 3,3'-[(2,3,5,6-tetrafluorobenz-1,4-diyl)bis(oxy)]dianiline, 4,4'-[(2,3,5,6-tetrafluorobenz-1,4-diyl)bis(oxy)]dianiline, bis[4-(4- aminophenoxy)phenyl]sulfone or bisphenol A, most preferably from 1,3-bis-(4-aminophenoxy)benzene, or bis[4-(4-aminophenoxy)phenyl]sulfone.

In the preferred embodiment, the monomer is used in the amount of 20-80 wt % of the polymerizable mixture weight or 30-80 wt % of the polymerizable mixture weight, or 20-70 wt % of the polymerizable mixture weight, in a more preferable case 30-70 wt % of the polymerizable mixture weight, or 40-70 wt % of the polymerizable mixture weight, or 40-60 wt % of the polymerizable mixture weight, or 40-55 wt % of the polymerizable mixture weight, preferably in the amount of 30-70 wt % of the polymerizable mixture weight.

In the preferred embodiment, the plasticizer is used in the amount of 5-70 wt % of the total polymerizable mixture weight, or in the amount of 5-60 wt % of the total polymerizable mixture weight, or in the amount of 20-70 wt % of the total polymerizable mixture weight, or in the amount of 20-60 w of the total polymerizable mixture weight, or in the amount of 25-60 wt % of the total polymerizable mixture weight, or in the amount of 25-50 wt % of the total polymerizable mixture weight, or in the amount of 30-60 wt % of the total polymerizable mixture weight, or in the amount of 30-50 wt % of the total polymerizable mixture weight.

In the preferred embodiment, the curing agent is used in the amount from 2 to 20 wt % of the total polymerizable mixture weight, or from 5 to 20 wt % of the total polymerizable mixture weight, or from 5 to 15 wt % of the total polymerizable mixture weight, or more preferably from 5 to 10 wt % of the total polymerizable mixture weight, In the preferred embodiment, to homogenize the polymerizable mixture it is heated to the temperature of 100-180° C., more preferably in the range of 100-160° C., most preferably in the range of 100-140° C.

In the preferred embodiment, the mixture obtained after the addition of initiator to the polymerizable mixture is stirred at the temperature of 100-160° C., more preferably at 100-140° C., more preferably at 100-120° C., for 10-180 minutes, more preferably for 10-120 minutes, more preferably for 60-120 minutes, more preferably for 15-45 minutes.

Another aspect of the invention relates to the method for obtaining resin matrix compositions for producing prepregs as described in the invention, which includes mixing in a reactor a polymerizable mixture comprising:
one or more bis-phthalonitrile monomers selected from monomers with the general formula

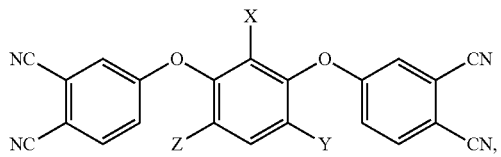

where X, Y, Z are independently selected from a group consisting of H, F, Cl, Br, and CH$_3$, in an amount of 20 to 94 wt % of the polymerizable mixture,
one or more reactive plasticizers-fire retardants selected from compounds with the general formula

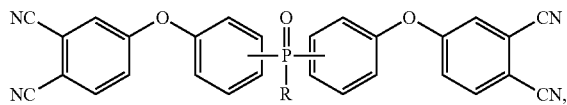

where group

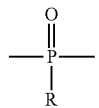

can be in either meta- or para-position relative to the oxygen atom bonded to the benzene ring, and R is an aryl, oxyaryl, alkyl, or oxyalkyl group
or the general formula

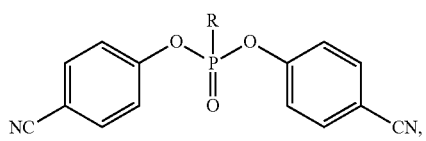

where R is selected from aryl, oxyaryl, alkyl, or oxyalkyl group, the reactive plasticizers-fire retardants comprising 5 to 80 wt % of the polymerizable mixture, and
one or more reactive diluents selected from compounds with the general formula

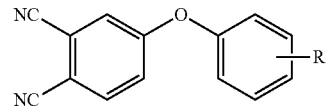

where R can be in meta- or para-position relative to the oxygen atom bonded to the benzene ring and is either H, CN, NH$_2$, or N(C$_3$H$_3$)$_2$, the reactive diluents comprising 1 to 50% of total weight of the polymerizable mixture,
more specifically the plasticizer and the diluent are added to the reactor first, heated to a temperature in the range of 100 to 140° C. to liquefy the components, after which they are stirred and the monomer powder is added while not being allowed to dissolve,
adding the curing agent selected from aromatic diamines or bisphenols having a boiling point of at least 180° C. at 0.1 mm Hg vacuum in the amount of 1-20 wt % of the total weight of the polymerizable mixture to the obtained suspension of curing agent,
stirring of thus obtained mixture at a temperature in the range 100 to 160° C. for 5-180 minutes and discharging of the obtained composition without cooling followed nu allowing the composition to cool.

In the preferred embodiment, the reactive diluent is selected from one or more compounds from the group consisting of 4-[3-(dipropargylamino)phenoxy]phthalonitrile, 4-[4-(dipropargylamino)phenoxy]phthalonitrile, 4-(4-cyanophenoxy)-phthalonitrile, 4-(3-cyanophenoxy)-phthalonitrile and 4-(4-aminophenoxy)-phthalonitrile, 4-(3-aminophenoxy)-phthalonitrile, especially preferably from 4-(4-cyanophenoxy)-phthalonitrile, 4-[4-(dipropargylamino)phenoxy]phthalonitrile, and 4-(4-aminophenoxy)-phthalonitrile.

In the preferred embodiment, the aryl is an optionally substituted aryl C$_6$-C$_{20}$, preferably aryl C$_6$-C$_{18}$, more preferably unsubstituted aryl C$_{6-10}$ or substituted aryl C$_6$, where the substituent can be a methyl, fluoro, chloro, bromo, or trifluoromethyl group, it is preferred if the aryl is a phenyl;

the oxyaryl is an oxyaryl —O($C_6$-$C_{20}$), preferably oxyaryl —O($C_6$-$C_{18}$), more preferably unsubstituted oxyaryl —O($C_{6-10}$) or substituted oxyaryl —O($C_6$), where the substituent can be a methyl, fluoro, chloro, bromo, or trifluoromethyl group, it is preferred if the oxyaryl is an oxyphenyl; the alkyl is a straight-chain or branched-chain alkyl $C_1$-$C_8$, preferably alkyl $C_2$-$C_6$, most preferably alkyl $C_3$-$C_4$; the oxyalkyl is a straight-chain or branched-chain oxyalkyl —O($C_1$-$C_8$), preferably oxyalkyl —O($C_2$-$C_6$), most preferably oxyalkyl —O($C_3$-$C_4$).

In the preferred embodiment, the monomer is selected from one or more compounds from the group consisting of 1,3-bis-(3,4-dicyanophenoxy) benzene, 1,3-bis-(3,4-dicyanophenoxy)-2-fluorobenzene, 1,3-bis-(3,4-dicyanophenoxy)-4-fluorobenzene, 1,3-bis-(3,4-dicyanophenoxy)-2-chlorobenzene, 1,3-bis-(3,4-dicyanophenoxy)-4-chlorobenzene, 1,3-bis-(3,4-dicyanophenoxy)-2-bromobenzene, 1,3-bis-(3,4-dicyanophenoxy)-4-bromobenzene, 1,3-bis-(3,4-dicyanophenoxy)-2,4-difluorobenzene, 1,5-bis-(3,4-dicyanophenoxy)-2,4-dichlorobenzene, 1,3-bis-(3,4-dicyanophenoxy)-2-methylbenzene, more preferably from 1,3-bis-(3,4-dicyanophenoxy) benzene, 1,3-bis-(3,4-dicyanophenoxy)-2-fluorobenzene, 1,3-bis-(3,4-dicyanophenoxy)-4-fluorobenzene, 1,3-bis-(3,4-dicyanophenoxy)-2,4-difluorobenzene, it is most preferred to use 1,3-bis-(3,4-dicyanophenoxy) benzene.

In the preferred embodiment, the reactive plasticizer-fire retardant is selected from one or more compounds from the group consisting of bis-(4-cyanophenoxy)-phenylphosphate, bis-(3-(3,4-dicyanophenoxy)-phenylphosphate, bis-(3-(3,4-dicyanophenoxy)-1-naphthylphosphate, bis-(4-cyanophenoxy)-phenylphosphonate, bis-(3-(3,4-dicyanophenoxy)phenyl)-phenylphosphonate, bis-(3-(3,4-dicyanophenoxy)phenyl)-isopropylphosphate, bis-(3-(3,4-dicyanophenoxy)phenyl)-butylphosphate, bis-(3-(3,4-dicyanophenoxy)phenyl)-propargylphosphate, bis-(4-cyanophenyl)phenylphosphate, bis-(3-cyanophenoxy) phenylphosphate and bis-4-(3,4-dicyanophenoxy)phenyl) phenylphosphate, more preferably from bis-(4-cyanophenoxy)-phenylphosphate, bis-(3-(3,4-dicyanophenoxy)-phenylphosphate, bis-(3-(3,4-dicyanophenoxy)phenyl)-isopropylphosphate, bis-(3-(3,4-dicyanophenoxy)phenyl)-butylphosphate.

In the preferred embodiment, the curing agent is selected from the following compounds:

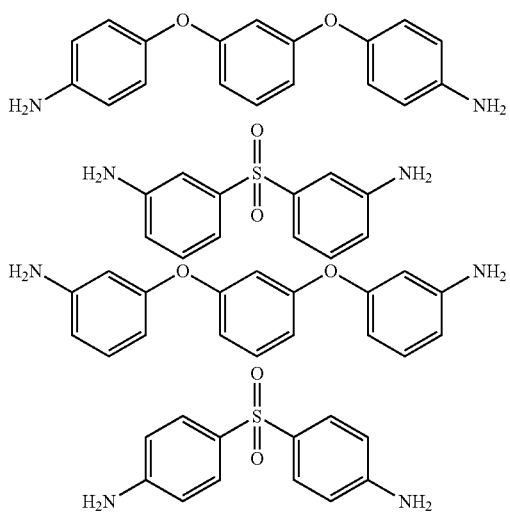

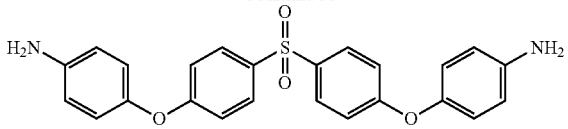

or from the compounds with the general formula

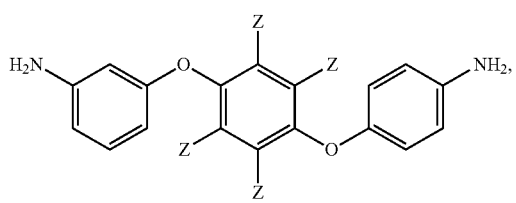

where Z stands for H or F, or from the compounds with the general formula

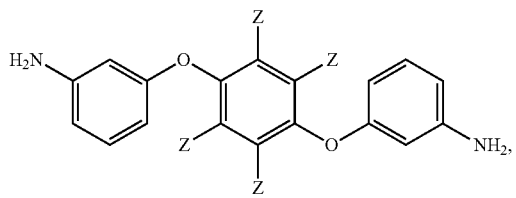

where Z stands for H or F, or bisphenols, or more preferably from 1,3-bis-(4-aminophenoxy)benzene, 4,4'-diaminodiphenylsulfone, 3,3'-diaminodiphenylsulfone, 3,3'-[(2,3,5,6-tetrafluorobenz-1,4-diyl)bis(oxy)]dianiline, 4,4'-[(2,3,5,6-tetrafluorobenz-1,4-diyl)bis(oxy)]dianiline, bis[4-(4-aminophenoxy)phenyl]sulfone or bisphenol A, most preferably from 1,3-bis-(4-aminophenoxy)benzene, or bis[4-(4-aminophenoxy)phenyl]sulfone.

In the preferred embodiment, the monomer is used in the amount of 20-80 wt % of the polymerizable mixture weight or 30-80 wt % of the polymerizable mixture weight, or 20-70 wt % of the polymerizable mixture weight, in more preferable case 30-70 wt % of the polymerizable mixture weight, or 40-70 wt % of the polymerizable mixture weight, or 40-60 wt % of the polymerizable mixture weight, or 40-55 wt % of the polymerizable mixture weight, preferably in the amount of 30-70 wt % of the polymerizable mixture weight.

In the preferred embodiment, the plasticizer is used in the amount of 5-70 wt % of the total polymerizable mixture weight, or in the amount of 5-60 wt % of the total polymerizable mixture weight, or in the amount of 20-70 wt % of the total polymerizable mixture weight, or in the amount of 20-60 w of the total polymerizable mixture weight, or in the amount of 25-60 wt % of the total polymerizable mixture weight, or in the amount of 25-50 wt % of the total polymerizable mixture weight, or in the amount of 30-60 wt % of the total polymerizable mixture weight, or in the amount of 30-50 wt % of the total polymerizable mixture weight.

In the preferred embodiment, one or more reactive diluents mentioned above are added to the polymerizable mixture in the amount from 1 to 40 wt % of the total mixture weight or from 10 to 50 wt % of the total mixture weight, or from 10 to 40 wt % of the total mixture weight, from 20 to 40 wt % of the total mixture weight, or from 20 to 35 wt % of the total mixture weight, or from 20 to 30 wt % of the total mixture weight, preferably from 10 to 40 wt % of the total mixture weight, or in the amount from 10 to 30 wt % of the total mixture weight.

In the preferred embodiment, the curing agent is used in the amount from 2 to 20 wt % of the total polymerizable mixture weight, or from 5 to 20 wt % of the total polymerizable mixture weight, or from 5 to 15 wt % of the total polymerizable mixture weight, or more preferably from 5 to 10 wt % of the total polymerizable mixture weight, In the preferred embodiment, to homogenize the polymerizable mixture it is heated to the temperature of 100-180° C., more preferably in the range of 100-160° C., most preferably in the range of 100-140° C.

In the preferred embodiment, the mixture obtained after the addition of initiator to the polymerizable mixture is stirred at the temperature of 100-160° C., more preferably at 100-140° C., more preferably at 100-120° C., for 10-180 minutes, more preferably for 10-120 minutes, more preferably for 10-30 minutes.

In the preferred embodiment, an inert filler selected from quartz powder, carbon black, barium sulfate, metal phthalocyanides, pyrogenic silica, titanium oxide, and any mixture of at least two of said materials is added to the reactor. The filler can be added at the stage of polymerizable mixture preparation prior to initiator addition or to the already prepared resin matrix compositions for prepregs prior to cooling of the obtained mixture.

Another aspect of the proposed invention relates to the method for curing of the said resin matrix composition that includes stages during which the resin is degassed under vacuum while stirring at the pressure of no more than 1333 Pa at the temperature of 100-180° C., the degassed material is heated to the temperature in the range of 180-190° C., and held at that temperature for 1-12 hours until cured, after which the product is subjected to final curing (post-curing) by heating in the way that avoids transition of the resin matrix from the glass to rubbery state (devitrification). To this end it is necessary for the matrix glass transition temperature to be above the heating temperature at any point. In the preferred embodiment of the invention, the material is heated at the rate of 10° C./min-10° C./hour to the temperature in the range of 250-375° C. and held at that temperature for 2-12 hours, notably the post-curing can be carried out in the mold or without it.

One more aspect of the proposed invention relates to the method for obtaining polymer composite material containing a reinforcing filler selected from carbon, aramid, or glass materials, and a resin matrix, and distinguished by the fact that the resin described in the invention is used to impregnate the reinforcing material at the temperature of 100-140° C. and resin matrix is cured via the method described in the invention.

In the preferred method of embodiment, the reinforcing material impregnation with resin is carried out by vacuum infusion.

Alternatively, the composite materials can also be obtained by other methods—resin transfer molding (RTM) or winding and using carbon, aramid, or glass materials as reinforcing fillers.

In the preferred method of embodiment, the method for fabrication of composite materials includes stages during which N layers (at least 2) of carbon fabric are placed in a mold, packed in a vacuum bag, and the reinforcing material is impregnated with the resin at the temperature of 100-140° C.

In the preferred method of embodiment, the carbon material used is either chopped (discrete) carbon fiber, unidirectional carbon tape, carbon fabric with two-dimensional or three-dimensional weaving.

One more aspect of the proposed invention is related to the polymer composite material obtained using the resin matrix composition described in the invention. In the preferred case, the fraction of resin matrix in the obtained carbon fiber reinforced plastics is 30-40 wt %.

EMBODIMENTS OF THE INVENTION

The monomers suitable for embodiment of the proposed inventions can be obtained via methods described in, for instance, Liu, Cheng; Wang, Jinyan; Lin, Encheng; Zong, Lishuai; Jian, Xigao. Synthesis and properties of phthalonitrile-terminated oligomeric poly(ether imide)s containing a phthalazinone moiety. Polymer Degradation and Stability (2012), 97(3), 460-468.

Monomers 1,3-bis-(3,4-dicyanophenoxy)-2-fluorobenzene, 1,3-bis-(3,4-dicyanophenoxy)-4-fluorobenzene, 1,3-bis-(3,4-dicyanophenoxy)-2-chlorobenzene, 1,3-bis-(3,4-dicyanophenoxy)-4-chlorobenzene, 1,3-bis-(3,4-dicyanophenoxy)-2-bromobenzene, 1,3-bis-(3,4-dicyanophenoxy)-4-bromobenzene, 1,3-bis-(3,4-dicyanophenoxy)-2,4-difluorobenzene, 1,5-bis-(3,4-dicyanophenoxy)-2,4-dichlorobenzene, 1,3-bis-(3,4-dicyanophenoxy)-2-methylbenzene were obtained via methods analogous to the one used to obtain 1,3-bis-(3,4-dicyanophenoxy) benzene as described in literature (Alexander V. Babkin, Elvek B. Zodbinov, Boris A. Bulgakov, Alexey V. Kepman, and Viktor V. Avdeev. Low-melting siloxane-bridged phthalonitriles for heat-resistant matrices. *European Polymer Journal*, 66:452-457, 2015.), where instead of resorcin, respective substituted derivatives of resorcin are used: 2-fluororesorcin, 4-fluororesorcin, 2-chlororesorcin, 4-chlororesorcin, 2-bromoresorcin, 4-bromoresorcin, 2,4-difluororesorcin, 2,4-dibromoresorcin, 2-methylresorcin.

The plasticizers-fire retardants suitable for embodiment of the proposed inventions can be obtained via methods described, for instance, in the document RU 2638307 or in B. A. Bulgakov, A. V. Babkin, P. B. Dzhevakov, A. A. Bogolyubov, A. V. Sulimov, A. V. Kepman, Yu G. Kolyagin, D. V. Guseva, V. Yu Rudyak, and A. V. Chertovich. Low-melting phthalonitrile thermosetting monomers with siloxane- and phosphate bridges. European Polymer Journal, (84):205-217, 2016, using 4-(3-hydroxyphenoxy)benzene-1,2-dicarbonitrile, 4-(4-hydroxyphenoxy)benzene-1,2-dicarbonitrile, 4-cyanophenol, 3-cyanophenol as the aromatic alcohols.

The curing agents suitable for embodiment of the proposed inventions are commercially available, for instance, from abcr GmbH, ACES Pharma, Merck KGaA, Ambinter Stock Screening Collection, Aurora Building Blocks, Aurora Screening Library, Sigma Aldrich.

The reactive diluents suitable for embodiment of the proposed inventions can be obtained via methods analogous to those described in Sheng, Haitong; Peng, Xuegang; Guo, Hui; Yu, Xiaoyan; Naito, Kimiyoshi; Qu, Xiongwei; Zhang, Qingxin. Synthesis of high performance bisphthalonitrile resins cured with self-catalyzed 4-aminophenoxyphthalonitrile. Thermochimica Acta (2014) 577, 17-24 (amino-phthalonitriles), and in https://patents.google.com/patent/WO2010024203A1/en?oq=WO+2010024203 (cyanophenoxy phthalonitriles).

Mixing of components in accordance with the invention, their heating and stirring can be carried out in any reactor of open or closed type fabricated, for instance, from aluminium, glass, stainless steel, hastelloy (a nickel alloy), titanium, high-carbon porcelain coated steel, etc.

Viscosity measurements were carried out using a rheometer MCR 302 according to GOST (Russian National Standard) 57950-2017.

Glass transition temperatures of resins were determined using differential scanning calorimeter NETZSCH DSC 204 Phoenix according to GOST (Russian National Standard) 55135-2012.

Thermogravimetric analysis studies were carried out using NETZSCH TG 209 F3 Tarsus. To conduct measurements in argon atmosphere a sample weight (4-10 mg) was placed in the instrument in a gold crucible. Weighing precision—$10^{-5}$ g. Measurements were conducted relative to baseline for empty crucible in argon atmosphere, volume flow rate of 150 mL/min. Measurements were conducted in the temperature range from 40 to 900° C. Heating rate was 10° C./min. Measurements in air were conducted in $Al_2O_3$ crucible with a sample weight 4-10 mg. Measurements were conducted relative to baseline for empty crucible in air atmosphere, volume flow rate of 150 mL/min. Measurements were conducted in the temperature range 40 to 1000° C. in air. Heating rate was 10° C./min.

Interlaminar shear strength was determined using Tinius Olsen 50ST setup according to GOST (Russian National Standard) 32659-2014.

$^1H$ and $^{13}C$ NMR spectra were recorded using spectrometer Bruker Avance III with operational frequencies of 600 and 150 MHz respectively. Deuterated dimethyl sulfoxide was used as the solvent.

Further are provided non-limiting examples for this application the goal of which is to illustrate the possibility of implementing the proposed inventions to reach the declared technical results.

Preparation of Resin Matrices:

Example 1

4-(4-(dipropargylamino)phenoxy)phthalonitrile was prepared. In a triple-neck flask (1000 mL) equipped with a reflux condenser and a dropping funnel, 50 g (0.2 mol) of 4-(4-aminophenoxy)phthalonitrile were dissolved in 450 mL of anhydrous DMAc. Potassium carbonate (55 g, 0.4 mol) and potassium bromide (4.75 g, 0.04 mol) were added to the system after complete dissolution of the added compound. The reaction mixture was stirred for 30 minutes, after which small portions of propargylchloride (37.5 g, 0.5 mol) were added over 20 minutes. The reaction mixture was heated to 60° C. and left to stir for 12 hours. Then a large excess of water (about 2500 mL) was added to the mixture, mixed, and left undisturbed for more hours. In the course of 2-3 hours the target product precipitate formed. The precipitate was filtered off and washed with more portions of hot water, after which the product was placed in an oven. The resulting product—orange-brown powder. Yield—59.5 g (96%).

$^1H$ NMR (DMSO-$d_6$) δ ppm 8.06 (d, J=8.80 Hz, 1H), 7.70 (d, J=2.57 Hz, 1H), 7.29 (dd, J=8.80, 2.57 Hz, 1H), 7.11 (d, J=4.77 Hz, 2H), 7.03 (d, J=4.77 Hz, 2H), 4.18 (d, J=2.20 Hz, 4H), 3.19 (s, 2H)

$^{13}C$ NMR (DMSO-$d_6$) δ ppm 75.66 (s) 80.21 (s) 83.31 (s) 107.86 (s) 115.92 (s) 116.45 (s) 116.91 (s) 117.01 (s) 121.51 (s) 121.64 (s) 122.41 (s) 136.72 (s) 145.71 (s) 145.96 (s) 162.50 (s).

Elemental analysis for $C_{20}H_{13}N_3O$: Calculated values: C (77.17), H (4.18), N (13.50).

Experimental values: C (77.11), H (4.22), N (13.48).

Example 2

4-(3-(dipropargylamino)phenoxy)phthalonitrile was obtained according to the method repeating the method for producing 4-(4-(dipropargylamino)phenoxy)phthalonitrile (Example 1), except 4-(3-aminophenoxy)phthalonitrile was used instead of 4-(4-aminophenoxy)phthalonitrile. Yield—94%.

$^1H$ NMR (600 MHz, DMSO-$d_6$) δ ppm 8.09 (d, J=8.80 Hz, 1H) 7.76 (d, J=2.38 Hz, 1H) 7.29-7.42 (m, 2H) 6.86 (dd, J=8.25, 2.02 Hz, 1H) 6.71 (broad s, 1H) 6.58 (dd, J=7.79, 1.65 Hz, 1H) 4.18 (d, J=1.83 Hz, 4H) 3.16 (m, 2H).

Elemental analysis for $C_{20}H_{13}N_3O$: Calculated values: C (77.17), H (4.18), N (13.50). Experimental values: C (77.19), H (4.20), N (13.63).

Example 3

500 g of 1,3-bis(3,4-dicyanophenoxy)benzene, 200 g of 4-[4-(dipropargylamino)phenoxy]phthalonitrile, and 300 g of bis(4-(3,4-dicyanophenoxy)phenyl) phenylphosphate were added to a 2-L reactor equipped with a mechanical stirrer. The reactor was put under vacuum (5 mm Hg) and heated to 180° C. until the resin components melted, after which stirring was initiated. Once the mixture was homogenized, 50 g of 1,3-bis-(4-aminophenoxy)benzene were added and stirred at 140° C. for 30 minutes. Then the mixture was poured onto a metal tray treated with an antiadhesive and left to cool. A green amorphous glassy substance was obtained. $T_g$=36° C., $\eta^{150°\ C.}$=25 mPa·s, $t_{gel}^{180°\ C.}$=190 min. In this and the following exampled glass transition temperature was determined via differential scanning calorimetry (DSC), and melt viscosity and gelation time were determined in the isothermal mode using Brookfield cone and plate viscometer.

Example 4

500 g of 1,3-bis(3,4-dicyanophenoxy)benzene and 500 g of bis(3-(3,4-dicyanophenoxy)phenyl) phenylphosphate were added to a 2-L reactor equipped with a mechanical stirrer. The reactor was put under vacuum (5 mm Hg) and heated to 160° C. until the resin components melted, after which stirring was initiated. Once the mixture was homogeneous, 40 g of 1,3-bis-(4-aminophenoxy)benzene and 10 g of 4-(4-aminophenoxy)phthalonitrile were added to the reactor and stirred at 130° C. for 30 minutes. Then the mixture was poured onto a metal tray treated with an antiadhesive and left to cool. A green amorphous glassy substance was obtained. $T_g$=19° C., $\eta^{150°\ C.}$=33 mPa·s, $t_{gel}^{180°\ C.}$=175 min.

Example 5

100 g of bis(3-(3,4-dicyanophenoxy)phenyl) phenylphosphate и 300 г bis-(4-cyanophenoxy)phenylphosphate and 100 g of 4-(4-cyanophenoxy)phthalonitrile were added to a 2-L reactor equipped with a mechanical stirrer. The reactor was put under vacuum (0.1 mm Hg) and heated to 120° C. to liquefy the resin components, after which stirring was initiated. Powdered 1,3-bis-(3,4-dicyanophenoxy)benzene (500 g) was slowly added and not allowed to dissolve. 50 g of 1,3-bis-(4-aminophenoxy)benzene were added to the obtained suspension and stirred at 130° C. for 15 minutes. Then the mixture was unloaded from the reactor and a green moldable suspension was obtained and used for prepreg preparation.

Example 6

500 g of bis(4-(3,4-dicyanophenoxy)phenyl)phenylphosphate, 200 g of bis-(3-(3,4-dicyanophenoxy)phenyl)phenylphosphate, and 50 g of 4-(3-aminophenoxy)benzene-1,2-dicarbonitrile were added to a 2-L reactor equipped with a mechanical stirrer. The reactor was put under vacuum (0.1 mm Hg) and heated to 100° C. to liquefy the resin components, after which stirring was initiated. Powdered 1,3-bis-(3,4-dicyanophenoxy)-2-fluorobenzene (300 g) was slowly added and not allowed to dissolve. 50 g of 1,3-bis-(4-aminophenoxy)benzene were added to the obtained suspension and stirred at 130° C. for 15 minutes. Then the mixture was unloaded from the reactor and a green moldable suspension was obtained and used for prepreg preparation.

Example 7

300 g of bis-(3-(3,4-dicyanophenoxy)phenyl)-propargylphosphate and 100 g of 4-(4-cyanophenoxy)-phthalonitrile were added to a 2-L reactor equipped with a mechanical stirrer. The reactor was put under vacuum (1 mm Hg) and heated to 140° C. to liquefy the resin components, after which stirring was initiated. Powdered 1,3-bis-(3,4-dicyanophenoxy)-2-fluorobenzene (300 g) was slowly added and not allowed to dissolve. 150 g of bisphenol A were added to the obtained suspension and stirred at 140° C. for 10 minutes. Then the mixture was unloaded from the reactor and a green moldable suspension was obtained and used for prepreg preparation.

Example 8

200 g of bis(3-(3,4-dicyanophenoxy)phenyl) isopropylphosphate and 300 g of 4-(4-cyanophenoxy)phthalonitrile were added to an open aluminium 3-L vessel equipped with a mechanical stirrer. The mixture was heated to 140° C. to melt the resin components, after which stirring was initiated. Powdered 1,5-bis-(3,4-dicyanophenoxy)-2,4-difluorobenzene (600 g) was added in small portions making sure each portion dissolved before the next one was added. 150 g of 1,3-bis-(4-aminophenoxy)benzene were added to the obtained melt and stirred at 140° C. for 15 minutes. Then the mixture was poured onto a metal plate, left to cool, and a green glassy substance was obtained. $T_g=21°$ C., $\eta^{150°\ C.}=27$ mPa·s, $t_{gel}^{180°\ C.}=90$ min.

Example 9

50 g of bis(3-(3,4-dicyanophenoxy)phenyl) butylphosphate and 350 g of 4-(4-cyanophenoxy)benzene-1,2-dicarbonitrile were added to an open aluminium 3-L vessel equipped with a mechanical stirrer. The mixture was heated to 140° C. to melt the resin components, after which stirring was initiated. Powdered 1,3-bis-(3,4-dicyanophenoxy)benzene (600 g) was added in small portions making sure each portion dissolved before the next one was added. 100 g of 4,4'-diaminodiphenylsulfone were added to the obtained melt and stirred at 140° C. for 15 minutes. Then the mixture was poured onto a metal plate, left to cool, and a green glassy substance was obtained. $T_g=27°$ C., $\eta^{150°\ C.}=45$ mPa·s, $t_{gel}^{180°\ C.}=146$ min.

Example 10

475 g of 1,3-bis-(3,4-dicyanophenoxy)benzene were added to a 2-L glass reactor equipped with a mechanical stirrer. The vessel was heated to 190° C. to melt the monomer, after which stirring was initiated. Powdered 4-(4-aminophenoxy)phthalonitrile (25 g) was added, followed by heated to 170° C. melt of 100 g of bis(3-(3,4-dicyanophenoxy)phenyl) propargylphosphate. The mixture was cooled to 160° C., and 30 g of 1,3-bis-(4-aminophenoxy)benzene were added and then stirred at 160° C. for 15 minutes. Then the mixture was poured onto a metal plate, left to cool, and a green glassy substance was obtained. $T_g=42°$ C., $\eta^{150°\ C.}=123$ mPa·s, $t_{gel}^{180°\ C.}=230$ min.

Example 11

225 g of 1,3-bis-(3,4-dicyanophenoxy)benzene and 225 g of 4-(3-cyanophenoxy)phthalonitrile were added to a 2-L glass reactor equipped with a mechanical stirrer. The mixture was heated to 160° C. to melt the resin components, after which stirring was initiated. Bis(3-(3,4-dicyanophenoxy)phenyl)phenylphosphate (50 g) was slowly added in small portions making sure each portion dissolved before the next one was added. The vessel was cooled to 120° C. 50 g of 1,3-bis-(4-aminophenoxy)benzene and 11 g of 3,3'-diaminodiphenylsulfone were added to the obtained melt, then stirred at 120° C. for 15 minutes under vacuum (0.1 mm Hg). Then the mixture was poured onto a metal plate, left to cool, and a green glassy substance was obtained. $T_g=18°$ C., $\eta^{150°\ C.}=17$ mPa·s, $t_{gel}^{180°\ C.}=160$ min.

Example 12

375 g of 1,3-bis-(3,4-dicyanophenoxy)benzene and 375 g of 4-(4-cyanophenoxy)phthalonitrile were added to an open aluminium 3-L vessel equipped with a mechanical stirrer. The vessel was heated to 160° C. to melt the resin components, after which stirring was initiated. Melted at 130° C. bis(3-(3,4-dicyanophenoxy)phenyl)phenylphosphonate (250 g) was slowly added in small portions. The vessel was cooled to 120° C. 50 g of bis[4-(4-aminophenoxy)phenyl]sulfone were added to the obtained melt and stirred at 110° C. for 15 minutes. Then the mixture was poured onto a metal plate, left to cool, and a green glassy substance was obtained. $T_g=19°$ C., $\eta^{150°\ C.}=21$ mPa·s, $t_{gel}^{180°\ C.}=165$ min.

Example 13

200 g of 1,3-bis-(3,4-dicyanophenoxy)benzene and 200 f of 4-(3-cyanophenoxy)phthalonitrile were added to an open aluminium 3-L vessel equipped with a mechanical stirrer. The vessel was heated to 170° C. to melt the resin components, after which stirring was initiated. Melt of bis(3-(3,4-dicyanophenoxy)phenyl)phenylphosphate (100 g) was slowly added in small portions making sure each portion dissolved before the next one was added. The vessel was cooled to 120° C. 75 g of 4,4'-[(2,3,5,6-tetrafluorobenz-1,4-diyl)bis(oxy)]dianiline were added to the obtained melt and stirred at 120° C. for 15 minutes.

Then the mixture was poured onto a metal plate, left to cool, and a green glassy substance was obtained. $T_g=19°$ C., $\eta^{150°\ C.}=16$ mPa·s, $t_{gel}^{180°\ C.}=120$ min.

Example 14

150 g of 1,3-bis-(3,4-dicyanophenoxy)benzene and 200 g of 4-(3-cyanophenoxy)phthalonitrile were added to an open aluminium 3-L vessel equipped with a mechanical stirrer. The vessel was heated to 150° C. to melt the resin components, after which stirring was initiated. Bis(3-(3,4-dicyanophenoxy)phenyl)isopropylphosphate (150 g) was slowly added in small portions making sure each portion dissolved before the next one was added. The vessel was cooled to 120° C. 100 g of bisphenol A were added to the obtained melt and stirred at 100° C. for 15 minutes. Then the mixture was poured onto a metal plate, left to cool, and a green glassy substance was obtained. $T_g=13°$ C., $\eta^{150°\ C.}=15$ mPa·s, $t_{gel}^{180°\ C.}=130$ min.

Example 15

250 g of 1,3-bis-(3,4-dicyanophenoxy)benzene were added to a 2-L glass reactor equipped with a mechanical stirrer. The reactor was heated to 170° C. to melt the resin, after which stirring was initiated and the reactor was put under vacuum (1 mm Hg). A melt of bis-(3-cyanophenoxy)phenyl phosphate (150 g) was slowly added in small portions making sure each portion dissolved before the next one was added. The vessel was cooled to 140° C. 100 g of 4-(4-aminophenoxy)phthalonitrile and 25 g of 1,3-bis-(3-aminophenoxy)benzene were added to the obtained melt and stirred at 100° C. for 15 minutes. Then the mixture was poured onto a metal plate, left to cool, and a green glassy substance was obtained. $T_g=20°$ C., $\eta^{150°\ C.}=33$ mPa·s, $t_{gel}^{180°\ C.}=43$ min.

Example 16

300 g of 1,3-bis-(3,4-dicyanophenoxy)benzene were added to an open aluminium 3-L vessel equipped with a mechanical stirrer. The vessel was heated to 170° C. to melt the resin, after which stirring was initiated. A melt of bis(4-(3,4-dicyanophenoxy)phenyl)phenylphosphate (150 g) was slowly added in small portions making sure each portion dissolved before the next one was added. The vessel was cooled to 120° C. 50 g of 4-(4-(dipropargylamino)phenoxy)phthalonitrile and 5 g of 1,3-bis-(3-aminophenoxy)benzene were added to the obtained melt and stirred at 120° C. for 15 minutes. Then the mixture was poured onto a metal plate, left to cool, and a green glassy substance was obtained. $T_g=33°$ C., $\eta^{150°\ C.}=36$ mPa·s, $t_{gel}^{180°\ C.}=110$ min.

Example 17

300 g of 1,3-bis-(3,4-dicyanophenoxy)benzene were added to an open aluminium 3-L vessel equipped with a mechanical stirrer. The vessel was heated to 170° C. to melt the resin, after which stirring was initiated. A melt of bis(4-(3,4-dicyanophenoxy)phenyl)phenylphosphate (150 g) was slowly added in small portions making sure each portion dissolved before the next one was added. The vessel was cooled to 120° C. 50 g of 4-(3-(dipropargylamino)phenoxy)phthalonitrile and 50 g of 1,3-bis-(3-aminophenoxy)benzene were added to the obtained melt and stirred at 120° C. for 15 minutes. Then the mixture was poured onto a metal plate, left to cool, and a green glassy substance was obtained. $T_g=26°$ C., $\eta^{150°\ C.}=22$ mPa·s, $t_{gel}^{180°\ C.}=30$ min.

Example 18

200 g of 1,3-bis-(3,4-dicyanophenoxy)-2-methylbenzene were added to a 2-L glass reactor equipped with a mechanical stirrer. The reactor was heated to 180° C. to melt the resin, after which stirring was initiated and the reactor was put under vacuum (1 mm Hg). Melts of bis-(3-(3,4-dicyanophenoxy)-1-naphthylphosphate (300 g), bis-(4-cyanophenyl)phenylphosphate (300 g), and (4-cyanophenoxy)phthalonitrile (200 g) were slowly added in small portions making sure each portion dissolved before the next one was added. The vessel was cooled to 100° C. 100 g of 3,3'-diaminodiphenylsulfone were added to the resulting melt and then stirred at 100° C. for 15 minutes. Then the mixture was poured onto a metal plate, left to cool, and a green glassy substance was obtained. $T_g=16°$ C., $\eta^{150°\ C.}=14$ mPa·s, $t_{gel}^{180°\ C.}=165$ min.

Example 19

300 g of 1,3-bis-(3,4-dicyanophenoxy)-2-bromobenzene were added to an open aluminium 3-L vessel equipped with a mechanical stirrer. The vessel was heated to 180° C. to melt the resin, after which stirring was initiated. A melt of bis(4-(3,4-dicyanophenoxy)phenyl)propargylphosphate (200 g) was slowly added in small portions making sure each portion dissolved before the next one was added. The vessel was cooled to 140° C. 50 g of 1,3-bis-(3-aminophenoxy)benzene, 50 g of bisphenol A were added to the resulting melt and stirred at 140° C. for 15 minutes. Then the mixture was poured onto a metal plate, left to cool, and a green glassy substance was obtained. $T_g=29°$ C., $\eta^{150°\ C.}=28$ mPa·s, $t_{gel}^{150°\ C.}=80$ min.

Example 20

100 g of bis(3-(3,4-dicyanophenoxy)phenyl) phenylphosphate and 300 g bis-(4-cyanophenoxy)phenyl phosphate and 100 g of 4-(4-cyanophenoxy)phthalonitrile were added to a 2-L glass reactor equipped with a mechanical stirrer. The reactor was put under vacuum (0.1 mm Hg) and heated to 120° C. to liquefy the resin components, after which stirring was initiated. Powdered 1,3-bis-(3,4-dicyanophenoxy)benzene (500 g) was slowly added and not allowed to dissolve. Then 400 g of quartz powder (GOST 9077-82) were added to the reactor in portions (5 times 80 g) while making sure it was evenly distributed in the entire volume. 50 g of 1,3-bis-(4-aminophenoxy)benzene were added to the mixture and stirred at 130° C. for 15 minutes. Then the mixture was unloaded from the reactor, and a green-yellow moldable suspension was obtained and used to prepare a prepreg.

Example 21

100 g of bis(3-(3,4-dicyanophenoxy)phenyl) phenylphosphate and 300 g of bis-(4-cyanophenoxy)phenyl phosphate and 100 g of 4-(cyanophenoxy)phthalonitrile were added to a 2-L reactor equipped with a mechanical stirrer. The reactor was put under vacuum (0.1 mm Hg) and heated to 120° C. to liquefy the resin components, after which stirring was initiated. Powdered 1,3-bis-(3,4-dicyanophenoxy)benzene (500 g) was slowly and not allowed to dissolve. Then 100 g of copper phthalocyanide (dye phthalocyanine blue) were added to the reactor in portions (2 times 50 g) while making sure it was evenly distributed in the entire volume. 50 g of 1,3-bis-(4-aminophenoxy)benzene and 12 g of pyrogenic silica (https://products-re.evonik.com/www2/uploads/productfinder/AEROSIL-R-202-EN.pdf) were added to the mixture, put under vacuum (1 mm Hg), and stirred at 130° C. for 15 minutes at maximum stirrer rotation speed (300 rpm). Then the mixture was unloaded from the reactor, and a dark green suspension was obtained and used to prepare a prepreg.

Example 22

500 g of resin obtained in example 5 were melted in a 2-L reactor at 120° C. 200 g of carbon black (http://www.vul-cascot.co.at/media/content/downloads/noritsa4pah.pdf) were added to the reactor and stirred under vacuum (1 mm Hg) at 120° C. Then the mixture was unloaded from the reactor, and a black suspension was obtained and used to prepare a prepreg.

Example 23

The prepreg was produced on an automated line designed by ZAO "INUMIT" (disclosed in RU106897 U1, 27.07.2011). The resin matrix composition obtained as described in example 5, 6, 20, 21, or 22 was used. The prepared resin was placed in a dispensing container, then the resin was dispensed on siliconized paper using heated rolls by forming a 100-110 micrometer thin film in the antiadhesive surface of the paper at paper movement rate of 0.2 m/min. The paper with resin was put together with carbon tape (carbon tape IMS65 on 24K fibers laid out in 0 direction) on a rolling press, then covered by a second layer of siliconized paper, and impregnated the fabric with resin matrix by putting through the heated rolling press under pressure. The even distribution of prepreg density was ensured by the even pressing of the rolls in the press. After impregnation the top layer of siliconized paper was automatically removed and winded onto a roll. The prepreg is smoothed, cooled, and wound on a spool.

It was preferred for the temperature of the dispensing container and on the impregnation rolls to be between 90° C. and 130° C. in order for optimal results to be obtained. At lower temperatures the viscosity of the resin is not always sufficient for effective application of film on the siliconized paper and impregnation of carbon tape, and at higher temperatures the value remains the same as that at 90-130° C. Therefore, heating to higher temperatures leads to additional energy costs that do not result in increased process efficiency.

The effect of the rate of the material passage through the setup was investigated. Samples were obtained at belt movement rates of 1, 2, 5 m/min. On one hand, high material movement rate ensures higher throughput, but also leads to the loss of sample quality. It was determined that for material feed rates above 1 m/min in some cases zones with insufficient impregnation of prepreg with resin matrix were observed, which resulted in delamination of the composite material.

Curing of Resin Matrices

Example 24

The resin obtained in example 9 was cured in a metal mold. The melt of resin was degassed under vacuum (1 mm Hg (133.32 Pa)) at 160° C. and stirring, then poured into a metal mold treated with an antiadhesive and placed in a programmable convection oven. The sample was cured at 180° C. for 6 hours, after which the mold was disassembled, and the material was heated to 375° C. at the rate of 10° C./h and held at 375° C. for 8 hours.

Example 25

The resin obtained in example 3 was cured in a metal mold. The melt of resin was degassed under vacuum (1 mm Hg) at 160° C. and stirring, then poured into a metal mold treated with an antiadhesive and placed in a programmable convection oven. The sample was heated to 180° C. at the rate of 2° C./min and cured for 8 hours, then taken out of the metal mold and heated at the rate of 10° C./h to 250° C. and held for 6 hours, then to 300° C. at the rate of 2° C./min and cured for 4 hours, then heated to 375° C. at the rate of 2° C./min and held at 375° C. for 8 hours.

Example 26

The resin obtained in example 4 was cured in a metal mold. The melt of resin was degassed under vacuum (1 mm Hg) at 160° C. and stirring, then poured into a metal mold treated with an antiadhesive and placed in a programmable convection oven and heated to 190° C. for 2 часов. The mold was disassembled, the free sample was heated to 250° C. at the rate of 2° C./min and cured for 4 hours, then to 300° C. at the rate of 2° C./min and cured for 4 hours, then the material was heated to 375° C. at the rate of 2° C./min and held at 375° C. for 8 hours.

Example 27

The resin obtained in example 12 was cured in a metal mold. The melt of resin was degassed under vacuum (1 mm Hg) at 140° C. and stirring, then poured into a metal mold treated with an antiadhesive and placed in a programmable convection oven. The sample was heated to 180° C. at the rate of 5° C./min and cured for 6 hours, then to 300° C. at the rate of 2° C./min and cured for 4 hours, then the material was heated to 375° C. at the rate of 2° C./min and held at 375° C. for 8 hours.

Example 28

The resin obtained in example 13 was cured in a metal mold. The melt of resin was degassed under vacuum (1 mm Hg) at 120° C. and stirring, then poured into a metal mold treated with an antiadhesive and placed in a programmable convection oven. The sample was heated to 180° C. at the rate of 5° C./min and cured for 6 hours, after which it was taken out of the mold and heated to 330° C. at the rate of 10° C./h and held at that temperature for 4 hours.

Example 29

The resin obtained in example 14 was cured in a metal mold. The melt of resin heated to 120° C. under stirring was poured into a metal mold treated with an antiadhesive and placed in a programmable convection oven. The sample was heated to 180° C. at the rate of 2° C./min and cured for 8 hours, after which it was taken out of the metal mold and heated to 350° C. at the rate of 5° C./h and held at that temperature for 6 hours.

Example 30

The resin obtained in example 15 was cured in a metal mold. The melt of resin heated to 120° C. under stirring was poured into a metal mold treated with an antiadhesive and placed in a programmable convection oven. The sample was heated to 180° C. at the rate of 2° C./min and cured for 3 hours, after which it was taken out of the metal mold and heated to 300° C. at the rate of 5° C./h and held at that temperature for 12 hours.

Example 31

The resin obtained in example 10 was cured in a metal mold. The melt of resin heated to 140° C. under stirring was poured into a metal mold treated with an antiadhesive and placed in a programmable convection oven. The sample was heated to 190° C. at the rate of 2° C./min and cured for 4 hours, after which it was taken out of the metal mold and heated to 375° C. at the rate of 10° C./h and held at that temperature for 8 hours.

TABLE 2

Properties of cured matrices.

| Resin matrix | $T_g$, ° C. | $T^{Ar}_{5\%}$, ° C. | $Y^{Ar}_c$, % | $T^{Air}_{5\%}$, ° C. | $Y^{Air}_c$, % |
|---|---|---|---|---|---|
| Example 24 | 412 | 515 | 77 | 490 | 14 |
| Example 25 | 460 | 489 | 75 | 490 | 23 |
| Example 26 | 428 | 490 | 76 | 490 | 18 |
| Example 27 | 423 | 503 | 78 | 495 | 19 |
| Example 28 | 361 | 485 | 74 | 480 | 13 |
| Example 29 | 401 | 520 | 81 | 522 | 21 |
| Example 30 | 323 | 488 | 72 | 476 | 9 | wherein $T^{Ar}_{5\%}$—a temperature of 5% mass loss temperature of 5% weight loss in argon; $T^{Air}_{5\%}$—a temperature of 5% mass loss temperature of 5% weight loss in air; $Y^{Ar}_c$—a char yield at 900° C. in argon; $Y^{Air}_c$—a char yield at 900° C. in air Preparation of PCM Samples by Vacuum Infusion.

Sample of carbon reinforced plastics were obtained by vacuum infusion. The bag was assembled on a stainless-steel mount coated with a silicon antiadhesive. Carbon fabric with 2×2 twill weaving and density of 200 g/m² (HTA-40 fiber, 3 k https://www.teijincarbon.com/ru/produkci%D1%8F/uglerodn%D1%8Be-volokna-tenax%C2%AE/zzgut%D1%8B-tenax%C2%AE/) was cut into 30×30 cm pieces and laid out according to $[0]_{12}$ formula. Then the vacuum bag was assembled, placed in an oven and heated to 100-140° C. The resin (600 g) was degassed in a glass reactor at the temperature of 100-140° C. and lowered pressure, then poured into a metal cup, moved to the oven, a tube connected to the bag was placed into the cup, and impregnation was started. After 10-15 minutes the resin matrix was coming out of the bag indicating the completion of the impregnation process. The bag was sealed, the temperature increased to 180° C.-250° C. at the rate of no more than 2° C./min and held at that temperature for 3-12 hours. Then the bag was disassembled, the precured sample was taken out and postcured as a free part according to the following program: heating to 180° C.-250° C. at the rate of no more than 2° C./min, holding for 15-60 min, heating to the post-curing temperature (300-375° C.) at the rate of 2° C./min-10° C./h, holding for 4-12 hours. The lower the heating rate, the better the mechanical properties of the material, the optimal rate is in the range of 10-30° C./h. The resulting carbon reinforced plastics contained 30-40 wt % of resin matrix.

The interlaminar shear strength ($\tau_{13}$) was determined according to the ASTM D2344 standard.

The in-plane shear strength ($\tau_{12}$) was determined according to the ASTM D3579 standard.

$\tau_{13}$—Interlaminar shear strength
$\tau_{12}$—In-plane shear strength

Example 32

A sample of carbon reinforced plastic was obtained according to the method shown above. A resin obtained according to example 12 was heated to 130° C., degassed. Impregnation was carried out in an ovenat 130° C. Upon impregnation completion temperature in the heating cabined was raised to 180° C. and curing was carried out according to the program described in example 30. PCM containing 32 wt % of resin matrix was obtained.

Example 33

A sample of carbon reinforced plastic was obtained according to the method described in example 32, but using unsized carbon fabric. The resin matrix content was 31 wt %.

Example 34

A sample of carbon reinforced plastic was obtained according to the method described above in example 32. A resin obtained according to example 3 was heated to 140° C., degassed. Impregnation was carried out in an oven at 140° C. Upon impregnation completion temperature in the heating cabined was raised to 180° C. and curing was carried out according to the program described in example 29. PCM containing 34 wt % of resin matrix was obtained.

Example 35

A sample of carbon reinforced plastic was obtained according to the method described above. A resin obtained according to example 12 was heated to 120° C., degassed. Impregnation was carried out in an oven at 120° C. Upon impregnation completion temperature in the heating cabined was raised to 180° C. and curing was carried out according to the program described in example 29. PCM containing 35 wt % of resin matrix was obtained.

Example 36

A sample of carbon reinforced plastic was obtained according to the method described above. A resin obtained according to example 4 was heated to 140° C., degassed. Impregnation was carried out in an oven at 140° C. Upon impregnation completion temperature in the heating cabined was raised to 180° C. and curing was carried out according to the program described in example 28. PCM containing 33 wt % of resin matrix was obtained.

Example 37

A sample of carbon reinforced plastic was obtained according to the method described above. A resin obtained according to example 15 was heated to 140° C., degassed. Impregnation was carried out in an oven at 140° C. Upon impregnation completion temperature in the heating cabined was raised to 180° C. and curing was carried out according to the program described in example 24. PCM containing 34 wt % of resin matrix was obtained.

Example 38

A sample of carbon reinforced plastic was obtained according to the method described above. A resin obtained according to example 13 was heated to 120° C., degassed. Impregnation was carried out in an oven at 120° C. Upon impregnation completion temperature in the heating cabined was raised to 180° C. and curing was carried out according to the program described in example 28. PCM containing 38 wt % of resin matrix was obtained.

Example 39

A sample of carbon reinforced plastic was obtained according to the method described above. A resin obtained according to example 14 was heated to 120° C., degassed. Impregnation was carried out in an oven at 100° C. Upon impregnation completion temperature in the heating cabined was raised to 180° C. and curing was carried out according to the program described in example 30. PCM containing 37 wt % of resin matrix was obtained.

Example 40

A sample of carbon reinforced plastic was obtained according to the method described above. A resin obtained according to example 18 was heated to 120° C., degassed. Impregnation was carried out in an oven at 110° C. Upon impregnation completion temperature in the heating cabined was raised to 180° C. and curing was carried out according to the program described in example 29. PCM containing 40 wt % of resin matrix was obtained.

| Material | Interlaminar shear strength, $\tau_{13}$, MPa | | | | |
| --- | --- | --- | --- | --- | --- |
| | 25° C. | 300° C. | 350° C. | 400° C. | 450° C. |
| Example 32 | 39 | 37 | 36 | 30 | 28 |
| Example 33 | 36 | 43 | 41 | 48 | 33 |
| Example 34 | 35 | 32 | 31 | 29 | — |
| Example 35 | 32 | 30 | 30 | — | — |
| Example 36 | 44 | 40 | 35 | 31 | 30 |
| Example 37 | 28 | 27 | 24 | 20 | — |
| Example 38 | 45 | 47 | 37 | — | — |
| Example 39 | 51 | 43 | 29 | — | — |

Raising the post-curing temperature leads to the decreased composite strength but also increases its operational temperature (the temperature at which the material strength is maintained at a sufficient level, at least 50% of the original value).

Comparative Example 1

700 g of 1,3-bis-(3,4-dicyanophenoxy)benzene, 300 g of bis(3-(3,4-dicyanophenoxy)phenyl)phenylphosphate were placed in a 2-L glass reactor equipped with a mechanical stirrer. The reactor was put under vacuum (1 mm Hg) and heated to 190° C. until the resin matrix components melted, after which stirring was initiated. Once the mixture was homogenized, 40 g of 1,3-bis-(4-aminophenoxy)benzene were added to the reactor and stirred at 160° C. for 30 minutes. Then the mixture was poured onto a metal tray treated with an antiadhesive and left to cool. A green amorphous glassy substance with crystalline phase inclusions was obtained. Determination of viscosity at 150° C. $\eta^{150°\ C.}$ was not possible due to resin matrix components crystallization between the cone and the rheometer plate.

Comparative Example 2

500 g of 1,3-bis-(3,4-dicyanophenoxy)benzene, 500 g of bis(3-(3,4-dicyanophenoxy)phenyl)phenylphosphate were placed in a 2-L glass reactor equipped with a mechanical stirrer. The reactor was put under vacuum (1 mm Hg) and heated to 190° C. until the resin matrix components melted, after which stirring was initiated. Once the mixture was homogenized, 40 g of 1,3-bis-(4-aminophenoxy)benzene were added to the reactor and stirred at 160° C. for 30 minutes. Then the mixture was poured onto a metal tray treated with an antiadhesive and left to cool. A green amorphous glassy substance was obtained. The viscosity at 150° C. was determined to be $\eta^{150°\ C.}$=600 mPa·s. Slow crystallization of the melt was observed in the process of viscosity determination.

Comparative Example 3

A sample of carbon reinforced plastic was obtained from a resin obtained according to Comparative Example 3. Carbon fabric with 2×2 twill weaving and density of 200 g/m² (HTA-40 fiber, 3 k) was cut into 30×30 cm pieces and laid out according to $[0]_{12}$ formula. Then a vacuum bag was assembled, placed in an oven, heated to 150° C. The resin (600 g) was degassed in a glass reactor at 160° C. and lowered pressure and then poured into a metal cup, transferred to the heating cabinet, the inlet tube of the bag was placed into it, and the impregnation process was started. After 10-15 minutes the resin came out of the bag indicating the completion of impregnation. The bag was hermetically sealed, the temperature in the heating cabinet was raised to 200° C. at the rate of 1° C./min and kept at that temperature for 24 hours. Then the bag was disassembled, the precured sample was taken out and then post-cured free-standing according to the following program: heating to 200° C.-250° C. at the rate of 2° C./min, holding for 15-60 minutes and heating to the post-curing temperature of 375° C. at the rate of 2° C./h, holding for 8 hours. A sample containing 37 wt % of resin matrix was obtained.

Comparative Example 4

500 g of 4,4'-bis-(3,4-dicyanophenoxy)biphenyl were placed in a 2-L glass reactor equipped with a mechanical stirrer and melted at 250° C.; 8 g of 1,3-bis-(4-aminophenoxy)benzene were added. The mixture was vigorously stirred at 250° C. for 15 minutes. A prepolymer was obtained with glass transition temperature of 80-90° C. and melting point of 220° C. The viscosity was 400-600 mPa s at 260° C.

Comparative Example 5

A sample of fiberglass reinforced plastic was obtained by vacuum infusion, to which end 12 layers of glass fabric were laid out and impregnation was carried out at 260° C., then the sample was held in the mold for 1 hour, then heated at the rate of 4° C./min to 325° C., held for 8 hours, after which it was held at 375° C. for 8 hours. A composite containing 54 vol. % of fiber was obtained.

The invention claimed is:

1. A resin matrix composition intended for producing a polymer composite material (PCM) or prepregs for PCM, comprising:
   (1) a polymerizable mixture comprising:
      one or more bis-phthalonitrile monomers selected from monomers of the following general formula:

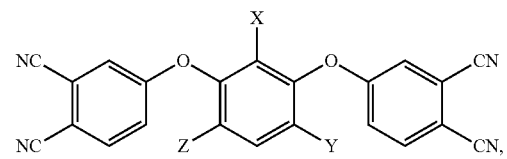

where X, Y, Z are independently selected from the group consisting of H, F, Cl, Br, and CH$_3$, in an amount of 20 to 94 wt % of the polymerizable mixture;

one or more reactive plasticizer fire retardants selected from compounds of the following general formula

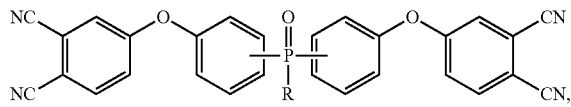

where group

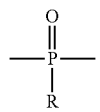

can be in either meta- or para-position relative to the oxygen atom bonded to the benzene ring, and R is selected from an aryl, oxyaryl, alkyl, or oxyalkyl group, or compounds of the following general formula

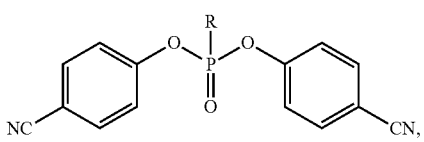

where R is selected from an aryl, oxyaryl, alkyl, or oxyalkyl group, the reactive plasticizer fire retardants comprising 5 to 80 wt % of the polymerizable mixture; and one or more reactive diluents selected from compounds of the following general formula

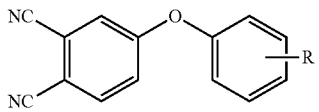

where R can be in meta- or para-position relative to the oxygen atom bonded to the benzene ring and is either H, CN, NH$_2$, or N(C$_3$H$_3$)$_2$, the reactive diluents comprising 1 to 50% of a total weight of the polymerizable mixture; and (2) a polymerization initiator comprising 1 to 20 wt % of the total weight of the polymerization mixture, the polymerization initiator selected from aromatic diamines or bisphenols with a boiling point of at least 180° C. at 0.1 mm Hg vacuum; wherein a total content of the polymerizable mixture and the polymerization initiator is 60-100 wt % of a total resin matrix weight of the resin matrix composition.

2. The composition of claim 1, wherein the reactive diluent is selected from one or more compounds from the group consisting of 4-[3-(dipropargylamino)phenoxy]phthalonitrile, 4-[4-(dipropargylamino)phenoxy]phthalonitrile, 4-(4-cyanophenoxy)-benzene-1,2-dicarbonitrile, 4-(4-cyanophenoxy)-phthalonitrile.

3. The composition of claim 1, wherein the active diluent is present in an amount from 1 to 40 wt % of the total weight of the mixture.

4. The composition of claim 1, wherein said aryl is an optionally substituted aryl C$_6$-C$_{20}$, wherein the substituent may be methyl, fluoro, chloro, bromo, or trifluoromethyl group; said oxyaryl is a —O(C$_6$-C$_{20}$) oxyaryl; said alkyl is a C$_1$-C$_8$ alkyl; said oxyalkyl is a —O(C$_1$-C$_8$) oxyalkyl.

5. The composition of claim 1, wherein the monomer is selected from one or more compounds from the group consisting of 1,3-bis-(3,4-dicyanophenoxy) benzene, 1,3-bis-(3,4-dicyanophenoxy)-2-fluorobenzene, 1,3-bis-(3,4-dicyanophenoxy)-4-fluorobenzene, 1,3-bis-(3,4-dicyanophenoxy)-2-chlorobenzene, 1,3-bis-(3,4-dicyanophenoxy)-4-chlorobenzene, 1,3-bis-(3,4-dicyanophenoxy)-2-bromobenzene, 1,3-bis-(3,4-dicyanophenoxy)-4-bromobenzene, 1,3-bis-(3,4-dicyanophenoxy)-2,4-difluorobenzene, 1,5-bis-(3,4-dicyanophenoxy)-2,4-dichlorobenzene, and 1,3-bis-(3,4-dicyanophenoxy)-2-methylbenzene.

6. The composition of claim 1, wherein the reactive plasticizer-fire retardant is selected from one or more compounds from the group consisting of bis-(4-cyanophenoxy)-phenylphosphate, bis-(3-(3,4-dicyanophenoxy)-phenylphosphate, bis-(3-(3,4-dicyanophenoxy)-1-naphthylphosphate, bis-(4-cyanophenoxy)-phenylphosphonate, bis-(3-(3,4-dicyanophenoxy)phenyl)-phenylphosphonate, bis-(3-(3,4-dicyanophenoxy)phenyl)-isopropylphosphate, bis-(3-(3,4-dicyanophenoxy)phenyl)-butylphosphate, bis-(3-(3,4-dicyanophenoxy)phenyl)-propargylphosphate, bis-(4-cyanophenyl)phenylphosphate, bis-(3-cyanophenoxy)phenylphosphate, and bis-4-(3,4-dicyanophenoxy)phenyl)phenylphosphate.

7. The composition of claim 1, wherein the polymerization initiator is selected from the following compounds:

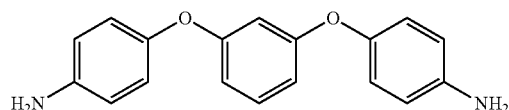

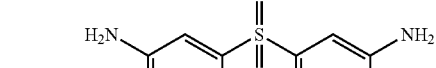

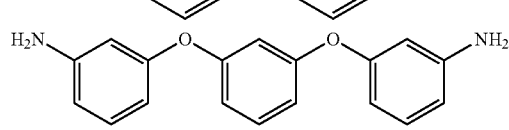

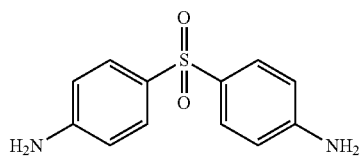

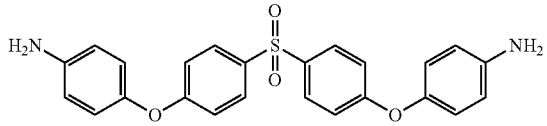

or from compounds of the following general formula

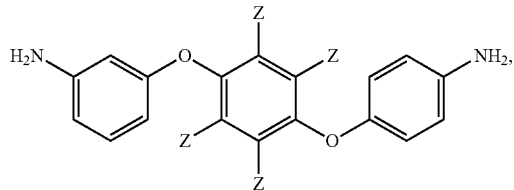

where Z stands for H or F, or from compounds of the following general formula

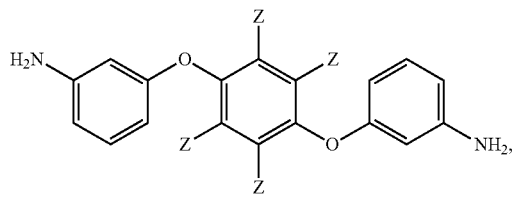

where Z is H or F, or bisphenols.

8. The composition of claim 1, wherein the monomer is present in an amount of 20-80 wt % of weight of the polymerizable mixture.

9. The composition of claim 1, wherein the plasticizer is present in the amount of 5-70 wt % of the total weight of the polymerizable mixture.

10. The composition of claim 1, wherein the polymerization initiator is present in the amount from 2 to 20 wt % of the total weight of the polymerizable mixture.

11. The composition of claim 1, wherein the composition is intended for preparation of a prepreg for PCM producing and further contains an inert filler selected from a quartz powder, carbon black, barium sulfate, metal phthalocyanides, pyrogenic silica, titanium oxide, and any mixture of at least two of said materials in the amount up to 40 wt of the total resin matrix weight.

12. A method for producing a resin matrix composition of claim 1, the method comprising a preparation of a polymerizable mixture in a reactor, the polymerizable mixture comprising
one or more bis-phthalonitrile monomers selected from monomers of the following general formula:

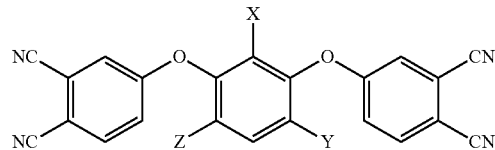

where X, Y, Z are independently selected from the group consisting of H, F, Cl, Br, and $CH_3$, in an amount of 20 to 94 wt % of the polymerizable mixture,
one or more reactive plasticizer fire retardants selected from compounds of the following general formula

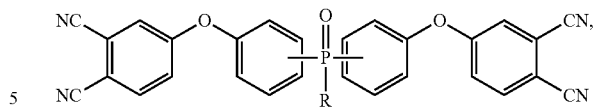

where group

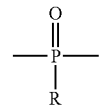

can be in either meta- or para-position relative to the oxygen atom bonded to the benzene ring, and R is an aryl, oxyaryl, alkyl, or oxyalkyl group,
or compounds of the following general formula

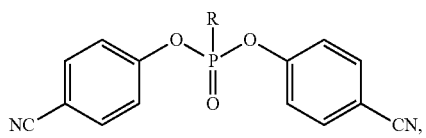

where R is selected from aryl, oxyaryl, alkyl, or oxyalkyl group, the reactive plasticizer fire retardants comprising 5 to 80 wt % of a total weight of the polymerizable mixture, and
one or more reactive diluents selected from compounds of the following general formula

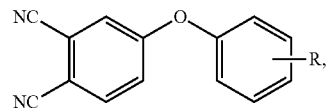

where R can be in meta- or para-position relative to the oxygen atom bonded to the benzene ring and is either H, CN, $NH_2$, or $N(C_3H_3)_2$, to the reactive diluents comprising 1 to 50% of the total weight of the polymerizable mixture;
and
putting the reactor under vacuum and heating to a temperature in the range of 100 to 180° C. until complete homogenization of the mixture,
adding a polymerization initiator to the obtained homogeneous mixture in an amount from 1 to 20 wt % of the total weight of the polymerizable mixture, wherein the polymerization initiator is selected from aromatic diamines and bisphenols having a boiling point of at least 180° C. under vacuum of 0.1 mm Hg;
stirring of thus obtained mixture at a temperature in the range of 100 to 160° C. for 5-180 minutes and discharging of the obtained composition without cooling followed by allowing the composition to cool.

13. The method of claim 12, wherein said one or more reactive diluents are added in an amount from 1 to 40 wt % of the total weight of the mixture.

14. The method of claim 13, wherein the reactive diluent is selected from one or more compounds from the group consisting of 4-[3-(dipropargylamino)phenoxy]phthalonitrile, 4-[4-(dipropargylamino)phenoxy]phthalonitrile, 4-(4- cyanophenoxy)-phthalonitrile, 4-(3-cyanophenoxy)-phthalonitrile, 4-(4-aminophenoxy)-phthalonitrile, and 4-(3-aminophenoxy)-phthalonitrile.

15. The method of claim 12, wherein said aryl is an optionally substituted aryl $C_6$-$C_{20}$, where the substituent may be methyl, fluoro, chloro, bromo, or trifluoromethyl group; said oxyaryl is a —O($C_6$-$C_{20}$) oxyaryl; said alkyl is a $C_1$-$C_8$ alkyl; said oxyalkyl is a —O($C_1$-$C_8$) oxyalkyl.

16. The method of claim 12, wherein the monomer is selected from one or more compounds from the group consisting of 1,3-bis-(3,4-dicyanophenoxy) benzene, 1,3-bis-(3,4-dicyanophenoxy)-2-fluorobenzene, 1,3-bis-(3,4-dicyanophenoxy)-4-fluorobenzene, 1,3-bis-(3,4-dicyanophenoxy)-2-chlorobenzene, 1,3-bis-(3,4-dicyanophenoxy)-4-chlorobenzene, 1,3-bis-(3,4-dicyanophenoxy)-2-bromobenzene, 1,3-bis-(3,4-dicyanophenoxy)-4-bromobenzene, 1,3-bis-(3,4-dicyanophenoxy)-2,4-difluorobenzene, 1,5-bis-(3,4-dicyanophenoxy)-2,4-dichlorobenzene, and 1,3-bis-(3,4-dicyanophenoxy)-2-methylbenzene.

17. The method claim 12, wherein the reactive plasticizer-fire retardant is selected from one or more compounds from the group consisting of bis-(4-cyanophenoxy)-phenylphosphate, bis-(3-(3,4-dicyanophenoxy)-phenylphosphate, bis-(3-(3,4-dicyanophenoxy)-1-naphthylphosphate, bis-(4-cyanophenoxy)-phenylphosphonate, bis-(3-(3,4-dicyanophenoxy)phenyl)-phenylphosphonate, bis-(3-(3,4-dicyanophenoxy)phenyl)-isopropylphosphate, bis-(3-(3,4-dicyanophenoxy)phenyl)-butylphosphate, bis-(3-(3,4-dicyanophenoxy)phenyl)-propargylphosphate, bis-(4-cyaonphenyl)phenylphosphate, bis-(3-cyanophenoxy) phenylphosphate, and bis-4-(3,4-dicyanophenoxy)phenyl) phenylphosphate.

18. The method of claim 12, wherein the polymerization initiator is selected from the following compounds:

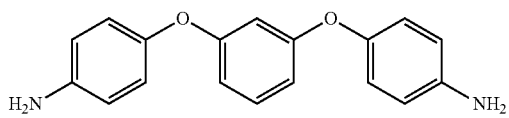

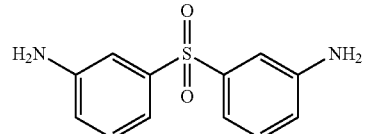

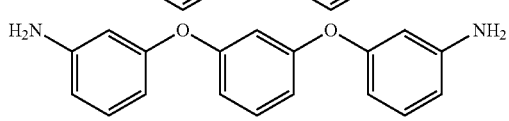

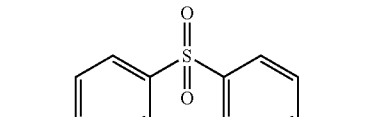

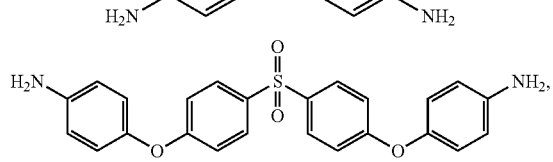

or from compounds of the following general formula

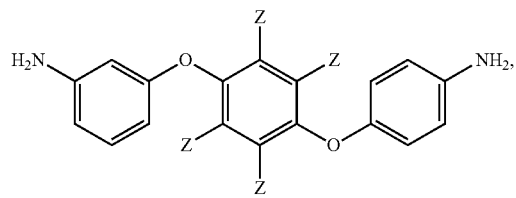

where Z is H or from compounds of the following general formula

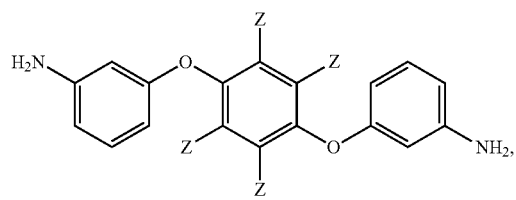

where Z is H or F, or bisphenols.

19. The method of claim 12, wherein the monomer is used in the amount of 20-80 wt % of weight of the polymerizable mixture.

20. The method of claim 12, wherein the plasticizer is used in the amount of 5-70 wt % of the total weight of the polymerizable mixture.

21. The method of claim 12, wherein the polymerization initiator is used in the amount from 2 to 20 wt of the total weight of the polymerizable mixture.

22. The method of claim 12, wherein the polymerizable mixture is heated to the temperature of 100-180° C. for homogenization.

23. The method of claim 12, wherein the mixture obtained after adding the initiator to the polymerizable mixture is stirred at a temperature in the range of 100 to 160° C. for 10-180 minutes.

24. A method for producing the resin matrix composition intended for producing prepregs for a polymer composite material (PCM) of claim 1, the method comprising mixing a polymerizable mixture in a reactor, the polymerizable mixture comprising one or more bis-phthalonitrile monomers selected from monomers of the following general formula:

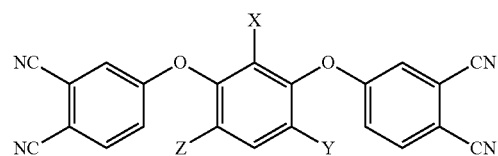

where X, Y, Z are independently selected from the group consisting of H, F, Cl, Br, and $CH_3$, in an amount of 20 to 94 wt % of weight of the polymerizable mixture, one or more reactive plasticizer fire retardants selected from compounds of the following general formula

where group

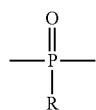

can be in either meta- or para-position relative to the oxygen atom bonded to the benzene ring, and R is selected from an aryl, oxyaryl, alkyl, or oxyalkyl group, or compounds of the following general formula

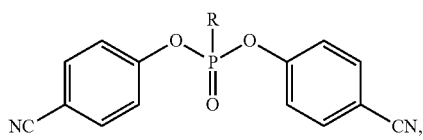

where R is selected from aryl, oxyaryl, alkyl, or oxyalkyl group, the reactive plasticizer fire retardants comprising 5 to 80 wt % of the polymerizable mixture, and
one or more reactive diluents selected from compounds of the following general

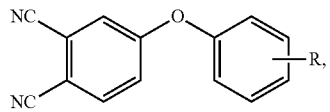

where R can be in meta- or para-position relative to the oxygen atom bonded to the benzene ring and is either H, CN, $NH_2$, or $N(C_3H_3)_2$, the reactive diluents comprising 1 to 50% of total weight of the polymerizable mixture;
wherein the plasticizer and the diluent are added to the reactor first, then heating is conducted to a temperature in the range 100-140° C. until the components are liquified, followed by stirring is initiated and the monomer powder is added, which is not allowed to dissolve,
adding a polymerization initiator to the obtained suspension in an amount from 1 to 20 wt % of the total weight of the polymerizable mixture, wherein the polymerization initiator is selected from aromatic diamines or bisphenols having a boiling point of at least 180° C. under vacuum of 0.1 mm Hg,
stirring of thus obtained mixture at a temperature in the range of 100 to 160° C. for 5-180 minutes and discharging the resulting composition without cooling followed by allowing it to cool.

25. The method of claim 24, wherein said one or more reactive diluents are added in an amount from 1 to 40 wt % of the total weight of the mixture.

26. The method of claim 24, wherein the reactive diluent is selected from one or more compounds from the group consisting of 4-[3-(dipropargylamino)phenoxy]phthalonitrile, 4-[4-(dipropargylamino)phenoxy]phthalonitrile, 4-(4-cyanophenoxy)-phthalonitrile, 4-(3-cyanophenoxy)-phthalonitrile, 4-(4-aminophenoxy)-phthalonitrile, and 4-(3-aminophenoxy)-phthalonitrile.

27. The method of claim 24, wherein said aryl is an optionally substituted aryl $C_6$-$C_{20}$, where the substituent may be methyl, fluoro, chloro, bromo, or trifluoromethyl group; said oxyaryl is a —$O(C_6$-$C_{20})$ oxyaryl; said alkyl is a $C_1$-$C_8$ alkyl; said oxyalkyl is a —$O(C_1$-$C_8)$ oxyalkyl.

28. The method of claim 24, wherein the monomer is selected from one or more compounds from the group consisting of 1,3-bis-(3,4-dicyanophenoxy) benzene, 1,3-bis-(3,4-dicyanophenoxy)-2-fluorobenzene, 1,3-bis-(3,4-dicyanophenoxy)-4-fluorobenzene, 1,3-bis-(3,4-dicyanophenoxy)-2-chlorobenzene, 1,3-bis-(3,4-dicyanophenoxy)-4-chlorobenzene, 1,3-bis-(3,4-dicyanophenoxy)-2-bromobenzene, 1,3-bis-(3,4-dicyanophenoxy)-4-bromobenzene, 1,3-bis-(3,4-dicyanophenoxy)-2,4-difluorobenzene, 1,5-bis-(3,4-dicyanophenoxy)-2,4-dichlorobenzene, and 1,3-bis-(3,4-dicyanophenoxy)-2-methylbenzene.

29. The method of claim 24, wherein the reactive plasticizer-fire retardant is selected from one or more compounds from the group consisting of bis-(4-cyanophenoxy)-phenylphosphate, bis-(3-(3,4-dicyanophenoxy)-phenylphosphate, bis-(3-(3,4-dicyanophenoxy)-1-naphthylphosphate, bis-(4-cyanophenoxy)-phenylphosphonate, bis-(3-(3,4-dicyanophenoxy)phenyl)-phenylphosphonate, bis-(3-(3,4-dicyanophenoxy)phenyl)-isopropylphosphate, bis-(3-(3,4-dicyanophenoxy)phenyl)-butylphosphate, bis-(3-(3,4-dicyanophenoxy)phenyl)-propargylphosphate, bis-(4-cyanophenyl)phenylphosphate, bis-(3-cyanophenoxy)phenylphosphate, and bis-4-(3,4-dicyanophenoxy)phenyl)phenylphosphate.

30. The method of claim 24, wherein the polymerization initiator is selected from the following compounds:

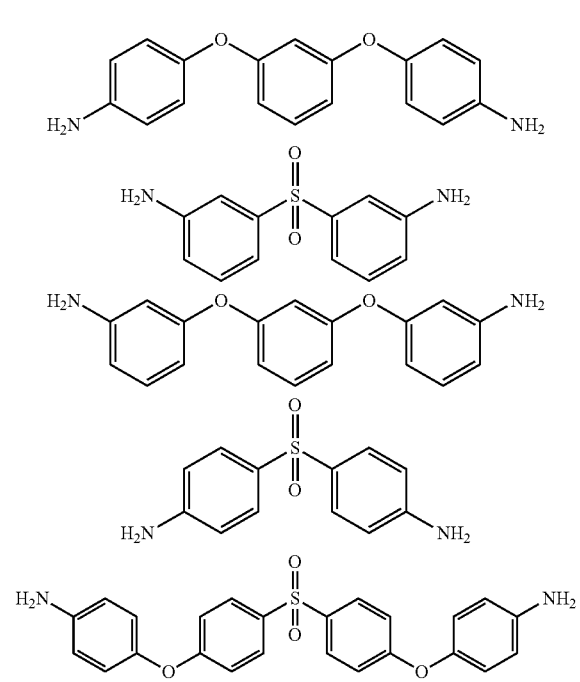

or from compounds with the general formula

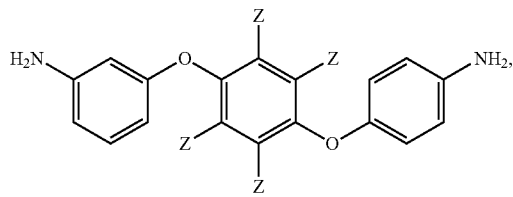

where Z is H or F, or from compounds of the following general formula

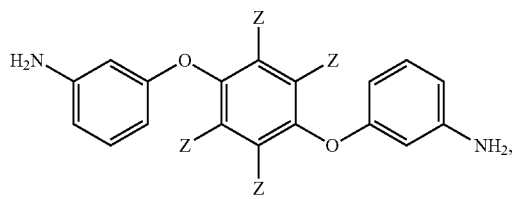

where Z is H or F, or bisphenols.

31. The method of claim 24, wherein the monomer is used in an amount of 20-80 wt % of weight of the polymerizable mixture.

32. The method of claim 24, wherein the plasticizer is used in the amount of 5-70 wt % of the total weight of the polymerizable mixture.

33. The method of claim 24, wherein the polymerization initiator is used in the amount from 2 to 20 wt % of the total weight of the polymerizable mixture.

34. The method of claim 24, wherein the polymerizable mixture is heated to a temperature in the range of 100 to 180° C. for homogenization.

35. The method of claim 24, wherein the mixture obtained after adding the initiator to the polymerizable mixture is stirred at a temperature in the range of 100 to 160° C. for 10-180 minutes.

36. The method of claim 24 further comprising a step during which an inert filler selected from a quartz powder, a carbon black, barium sulfate, metal phthalocyanides, pyrogenic silica, titanium oxide, and any mixture of at least two of said materials is added to the component mixture in an amount up to 40 wt % of the total weight of the resin matrix, wherein the filler is added either prior to adding the polymerization initiator or to the final mixture before it cools.

37. A method for curing of a resin matrix composition of claim 1 the method comprising steps during which the resin matrix is degassed under vacuum while stirring at a pressure of no more than 1333 Pa and temperature in the range of 100 to 180° C., the obtained degassed material is heated to a temperature in the range of 180 to 190° C. and held to cure for 1-12 hours, after which the obtained product is post-cured by heating while maintaining the heating temperature at a level below a glass transition temperature of the matrix at every moment.

38. The method of claim 37 wherein the material is heated at a rate of 10° C./min-10° C./h to the temperature in the range of 250 to 375° C. and held for 2-12 hours, while the post-curing can be carried out in the mold or without it.

39. A method for producing a polymer composite material containing a reinforcing material selected from carbon, aramid, or glass materials, and a resin matrix, wherein a resin matrix composition of claim 1 is used to impregnate the reinforcing material, the impregnating is conducted at a temperature in the range of 100 to 160° C. and the resin matrix composition is cured via a method of claim 37.

40. The method of claim 39, wherein the impregnation of the reinforcing material with the resin matrix composition is carried out by vacuum infusion.

41. The method of claim 39, wherein the impregnation of the reinforcing material with the resin matrix composition is carried out by resin transfer molding (RTM) or winding.

42. The method of claim 39, wherein the carbon material is used as the reinforcing filler.

43. The method of claim 39 further comprising steps, during which at least 2 layers of carbon fabric are laid out, packed into a vacuum bag, and the carbon material is impregnated with the resin matrix composition at the temperature of 100-140° C..

44. The method of claim 39, wherein the carbon material used is a discrete carbon fiber, an unidirectional carbon tape, a carbon fabric with two-dimensional or three-dimensional weaving.

45. A polymer composite material obtained using from the resin matrix composition of claim 1.

46. The material of claim 45, wherein the fraction of a resin matrix in it makes up from 30 to 40 wt %.

* * * * *